US010131394B2

(12) United States Patent
Sasaki et al.

(10) Patent No.: US 10,131,394 B2
(45) Date of Patent: Nov. 20, 2018

(54) VEHICLE

(71) Applicant: YAMAHA HATSUDOKI KABUSHIKI KAISHA, Iwata-shi, Shizuoka (JP)

(72) Inventors: Kaoru Sasaki, Shizuoka (JP); Mitsuaki Ohta, Shizuoka (JP); Kazuhisa Takano, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 458 days.

(21) Appl. No.: 14/901,356

(22) PCT Filed: Jun. 30, 2014

(86) PCT No.: PCT/JP2014/067482
§ 371 (c)(1),
(2) Date: Dec. 28, 2015

(87) PCT Pub. No.: WO2015/002169
PCT Pub. Date: Jan. 8, 2015

(65) Prior Publication Data
US 2016/0137247 A1    May 19, 2016

(30) Foreign Application Priority Data

Jul. 1, 2013  (JP) ................................ 2013-138484
Jul. 1, 2013  (JP) ................................ 2013-138485

(51) Int. Cl.
*B62J 15/00* (2006.01)
*B62K 5/08* (2006.01)
(Continued)

(52) U.S. Cl.
CPC ............... *B62J 15/00* (2013.01); *B62K 5/027* (2013.01); *B62K 5/05* (2013.01); *B62K 5/08* (2013.01); *B62K 5/10* (2013.01)

(58) Field of Classification Search
CPC ......................................................... B62J 15/00
(Continued)

(56) References Cited

U.S. PATENT DOCUMENTS 4,351,410 A    9/1982  Townsend
4,458,909 A *  7/1984  Morioka ................ B62K 21/02
                                                        180/219

(Continued)

FOREIGN PATENT DOCUMENTS

CN         1386668 A      12/2002
CN       103153769 A       6/2013

(Continued)

OTHER PUBLICATIONS

Official Communication issued in corresponding European Patent Application No. 14819506.8, dated Oct. 17, 2017.

(Continued)

*Primary Examiner* — Ruth Ilan
(74) *Attorney, Agent, or Firm* — Keating and Bennett, LLP

(57) ABSTRACT

A left front fender includes a left upper wall portion, a left side wall portion, and a left guide portion. The left upper wall portion defines a left upper inner surface facing a portion of an upper surface of a left front wheel. The left side wall portion extends downward from the left upper inner surface to define a left side inner surface facing a left side surface of the left front wheel. The left guide portion defines a left guide surface extending rightward from the left side inner surface toward the left side surface of the left front wheel.

7 Claims, 13 Drawing Sheets

(51) Int. Cl.
*B62K 5/10* (2013.01)
*B62K 5/027* (2013.01)
*B62K 5/05* (2013.01)

(58) Field of Classification Search
USPC .................. 280/160.1, 152.2, 852; 293/105; 180/219
See application file for complete search history.

(56) References Cited

U.S. PATENT DOCUMENTS

| | | | |
|---|---|---|---|
| D547,242 S | 7/2007 | Lambri | |
| D598,328 S | 8/2009 | Lambri | |
| 9,227,662 B2 * | 1/2016 | Bartolozzi | B60G 3/01 |
| 9,758,207 B2 * | 9/2017 | Iizuka | B62K 19/38 |
| 2003/0221891 A1 * | 12/2003 | Fecteau | B62J 1/12 |
| | | | 180/210 |
| 2004/0140645 A1 | 7/2004 | Hayashi | |
| 2013/0168944 A1 | 7/2013 | Bartolozzi et al. | |
| 2014/0353940 A1 | 12/2014 | Bartolozzi et al. | |
| 2015/0321721 A1 * | 11/2015 | Sasaki | B62K 5/05 |
| | | | 180/210 |
| 2017/0088222 A1 * | 3/2017 | Ohno | B60G 5/04 |

FOREIGN PATENT DOCUMENTS

| | | |
|---|---|---|
| DE | 119917 C | 4/1901 |
| DE | 20 2007 000 278 U1 | 3/2007 |
| EP | 0 705 756 A1 | 4/1996 |
| EP | 1 391 374 A1 | 2/2004 |
| EP | 1 947 001 A1 | 7/2008 |
| ES | 2336487 T3 | 4/2010 |
| GB | 128428 A | 6/1919 |
| GB | 673705 A | 6/1952 |
| JP | 61-124478 U | 8/1986 |
| JP | 2-125890 U | 10/1990 |
| JP | 5-44772 U | 6/1993 |
| JP | 11-342866 A | 12/1999 |
| TW | 201210882 A | 3/2012 |
| WO | 2012/007819 A1 | 1/2012 |
| WO | 2013/002764 A1 | 1/2013 |

OTHER PUBLICATIONS

Official Communication issued in International Patent Application No. PCT/JP2014/067482, dated Sep. 22, 2014.
Takano; "Vehicle"; U.S. Appl. No. 14/652,832; filed Jun. 17, 2015.
Takano; "Vehicle"; U.S. Appl. No. 14/901,353; filed Dec. 28, 2015.

* cited by examiner

US 10,131,394 B2

VEHICLE

BACKGROUND OF THE INVENTION

1. Field of the Invention

The present invention relates to a vehicle which includes a leanable body frame and two front wheels which are arranged side by side in a left-right direction of the body frame.

2. Description of the Related Art

A vehicle is known including a body frame which leans in a left-right direction of the vehicle when the vehicle turns to the left or the right and two front wheels which are arranged side by side in a left-right direction of the body frame (refer to U.S. Design Pat. D547,242S, for example). This type of vehicle is a vehicle that turns with its body frame leaning from a vertical direction. More specifically, the body frame leans to the right of the vehicle when the vehicle turns to the right, while when the vehicle turns to the left, the body frame leans to the left of the vehicle. In this type of vehicle, a distance between the two front wheels which are arranged side by side in the left-right direction of the body frame is very short, compared with a general four-wheeled vehicle, so as to ensure a large leaning amount of the body frame. Consequently, this type of vehicle is compact in size in relation to the left-right direction of the body frame.

SUMMARY OF THE INVENTION

As a result of riding tests for this type of vehicle that were carried out at the time of raining or through pools of water, a phenomenon was confirmed that the leg portions of the rider sitting on the seat is splashed with water scattered by the front wheels.

Consequently, preferred embodiments of the present invention reduce the size of a vehicle including a leanable body frame and two front wheels arranged side by side in a left-right direction of the body frame, while significantly reducing or preventing leg portions of a rider sitting on a seat from being splashed with water scattered by the two front wheels.

A preferred embodiment of the present invention is a vehicle including a body frame that leans to the left of the vehicle when the vehicle turns leftward and that leans to the right of the vehicle when the vehicle turns rightward; a seat supported by the body frame; a left front wheel and a right front wheel disposed ahead of the seat in a front-rear direction of the body frame so as to be arranged side by side in a left-right direction of the body frame; a steering device that turns the left front wheel and the right front wheel; a left front fender that is turnable with the left front wheel and covers at least a portion of an upper surface of the left front wheel; and a right front fender that is turnable with the right front wheel and covers at least a portion of an upper surface of the right front wheel, wherein the left front fender and the right front fender are arranged side by side in the left-right direction of the body frame; the left front fender includes a left upper wall portion defining a left upper inner surface facing at least a portion of the upper surface of the left front wheel; a left side wall portion extending from the left upper inner surface downward in an up-down direction of the body frame and defining a left side inner surface facing a portion of a left side surface of the left front wheel; and a left guide portion defining a left guide surface extending from the left side inner surface rightward in the left-right direction toward the left side surface of the left front wheel; and the right front fender includes a right upper wall portion defining a right upper inner surface facing at least a portion of the upper surface of the right front wheel; a right side wall portion extending from the right upper inner surface downward in the up-down direction of the body frame and defining a right side inner surface facing a portion of a right side surface of the right front wheel; and a right guide portion defining a right guide surface extending from the right side inner surface leftward in the right-right direction toward the right side surface of the right front wheel.

The inventors studied in detail the reason for the occurrence of the phenomenon in which the leg portions of the rider sitting on the seat of the vehicle are splashed with water scattered by the two front wheels. As a result, the following phenomenon was discovered and confirmed.

Water scattered by the left front wheel while the vehicle is running adheres to an inner surface of the left front fender. The water that adheres falls from a lower edge of the inner surface of the left front fender to the left of the left front wheel in the form of water drops. The drops of water that have fallen are accelerated rearward by the air that flows rearward along the left of the left front wheel at high speeds to splash the leg portion or the like of the rider sitting on the seat provided behind the left front wheel.

Water scattered by the right front wheel while the vehicle is running adheres to an inner surface of the right front fender. The water that adheres falls from a lower edge of the inner surface of the right front fender to the right of the right front wheel in the form of water drops. The drops of water that have fallen are accelerated rearward by the air that flows rearward along an area to the right of the right front wheel at high speeds to splash the leg portion or the like of the rider sitting on the seat provided behind the right front wheel.

Namely, the phenomenon described above is attributed to the generation of the airflows that pass the left of the left front wheel and the right of the right front wheel and flow in the front-rear direction of the body frame at high speeds, in the vehicle including the leanable body frame and the two front wheels arranged side by side in the left-right direction of the body frame. In other words, the phenomenon described above is the specific phenomenon to a vehicle that includes a leanable body frame and two front wheels arranged side by side in the left-right direction of the body frame.

Then, the inventors studied a configuration that significantly reduces or prevents the amount of water that flows rearward of such a vehicle while reducing the size thereof. Specifically, speeds were analyzed at which air flows on the periphery of the vehicle while it is running. As a result, it was discovered that spaces where speeds at which air flows are slow are formed in positions near the left side surface of the left front wheel and the right side surface of the right front wheel. Then, the inventors discovered a construction that controls the water that drops from the inner surfaces of the front fenders by devising the shapes of the left and right front fenders based on the discoveries and knowledge obtained by the analysis described above.

Specifically, in the vehicle that includes the leanable body frame and the two front wheels that are arranged side by side in the left-right direction of the body frame, the left front fender and the right front fender are arranged side by side in the left-right direction of the body frame. The left front fender includes the left upper wall portion that defines the left upper inner surface that faces at least the portion of the upper surface of the left front wheel; the left side wall portion that extends downward from the left upper inner surface in the up-down direction of the body frame to define the left side inner surface that faces the portion of the left side surface of the left front wheel; and the left guide portion that defines the left guide surface that extends from the left side inner surface to the right of the body frame in the left-right direction thereof towards the left side surface of the left front wheel. The right front fender includes the right upper wall portion that defines the right upper inner surface that faces at least the portion of the upper surface of the right front wheel; the right side wall portion that extends downward from the right upper inner surface in the up-down direction of the body frame to define the right side inner surface that faces the portion of the right side surface of the right front wheel; and the right guide portion that defines the right guide surface that extends from the right side inner surface to the left of the body frame in the left-right direction thereof towards the right side surface of the right front wheel.

With the configuration described above, when the vehicle is running, airflows directed rearward are generated on the left of the left side wall portion of the left front fender and on the right of the right side wall portion of the right front fender. On the other hand, spaces where air flows at slow speeds are defined between the left side wall portion of the left front fender and the left side surface of the left front wheel as well as between the right side wall portion of the right front fender and the right side surface of the right front wheel.

The left upper inner surface of the left upper wall portion of the left front fender faces at least the portion of the upper surface of the left front wheel and receives water scattered upward by the left front wheel. The left side inner surface of the left side wall portion extends downward from the left upper inner surface to face the portion of the left side surface of the left front wheel not only to transfer downward the water received by the left upper inner surface but also to receive water scattered leftward by the left front wheel. The left guide surface of the left guide portion extends from the left side inner surface rightward towards the left side surface of the left front wheel so that the water coming along the left side inner surface is guided to a position that is located closer to the left side surface of the left front wheel than the left side wall portion of the left front fender, that is, to a position where air flows at slower speeds. In the spaces where air flows at slow speeds, since the water that drops from the left guide portion tends to fall towards the road surface, it is possible to significantly reduce or prevent water scattered by the left front wheel from being scattered rearward.

The right upper inner surface of the right upper wall portion of the right front fender faces at least the portion of the upper surface of the right front wheel and receives water scattered upward by the right front wheel. The right side inner surface of the right side wall portion extends downward from the right upper inner surface to face the portion of the right side surface of the right front wheel not only to transfer downward the water received by the right upper inner surface but also to receive water scattered rightward by the right front wheel. The right guide surface of the right guide portion extends from the right side inner surface leftward towards the right side surface of the right front wheel so that the water coming along the right side inner surface is guided to a position that is located closer to the right side surface of the right front wheel than the right side wall portion of the right front fender, that is, to a position where air flows at slower speeds. In the spaces where air flows at slow speeds, since the water that drops from the right guide portion tends to fall towards the road surface, it is possible to significantly reduce or prevent water scattered by the right front wheel from being scattered rearward.

In addition, the left guide portion of the left front fender includes the left guide surface that extends from the left side inner surface rightward in the left-right direction towards the left side surface of the left front wheel. The right guide portion of the right front fender includes the right guide surface that extends from the right side inner surface leftward in the left-right direction of the body frame towards the right side surface of the right front wheel. Since the left guide portion and the right guide portion make use of the spaces defined between the left front fender and the left front wheel as well as between the right front fender and the right front wheel, respectively, the vehicle is made smaller in size.

Consequently, it is possible to significantly reduce or prevent the generation of the phenomenon of the leg portions of the rider sitting on the seat being splashed with water scattered by the two front wheels while making the vehicle including the leanable body frame and the two front wheels that are arranged side by side in the left-right direction of the body frame small in size.

The vehicle is preferably configured such that at least a portion of the left guide portion is provided in a lower portion of the left side wall portion, and at least a portion of the right guide portion is provided in a lower portion of the right side wall portion.

According to the configuration described above, it is possible to allow water to drop from the left guide portion and the right guide portion at lower positions. This makes it difficult for water that has dropped to splash the leg portions of the rider even though the water is scattered rearward. Consequently, it is possible to significantly reduce or prevent the generation of the phenomenon of the leg portions of the rider sitting on the seat being splashed with water scattered by the two front wheels while making the vehicle including the leanable body frame and the two front wheels that are arranged side by side in the left-right direction of the body frame small in size.

The vehicle is preferably configured such that each of the left guide portion and the right guide portion includes a portion extending in the front-rear direction.

According to the configuration described above, the left guide portion allows the water that flows along the left side wall portion to drop to the position located near the left side surface of the left front wheel over a wider range. In addition, the right guide portion allows the water that flows along the right side wall portion to drop to the position located near the right side surface of the right front wheel over a wider range. Consequently, it is possible to significantly reduce or prevent the generation of the phenomenon of the leg portions of the rider sitting on the seat being splashed with water scattered by the two front wheels while making the vehicle including the leanable body frame and the two front wheels that are arranged side by side in the left-right direction of the body frame small in size.

For example, the vehicle is preferably configured such that the left guide portion extends at least one of forward and rearward in the front-rear direction than a wheel axle of the left front wheel, and the right guide portion extends at least one of forward and rearward in the front-rear direction than a wheel axle of the right front wheel.

Additionally or alternatively, the vehicle may be configured such that each of the left guide portion and the right guide portion is a continuously extending wall. In a case where a plurality of walls are arranged at such intervals that do not permit the passage of water therethrough, such walls may be regarded as the "continuously extending wall".

The vehicle is preferably configured such that at least a portion of a rear portion of the left upper wall portion and at least a portion of a rear portion of the left side wall portion are disposed below the left guide portion in the up-down direction of the body frame, and at least a portion of a rear portion of the right upper wall portion and at least a portion of a rear portion of the right side wall portion are disposed below the right guide portion in the up-down direction of the body frame.

According to the configuration described above, the water that drops from the left guide portion to be scattered rearward is received by the rear portion of the left upper wall portion and the rear portion of the left side wall portion. In addition, the water that drops from the right guide portion to be scattered rearward is received by the rear portion of the right upper wall portion and the rear portion of the right side wall portion. Consequently, it is possible to significantly reduce or prevent the generation of the phenomenon of the leg portions of the rider sitting on the seat being splashed with water scattered by the two front wheels while making the vehicle including the leanable body frame and the two front wheels that are arranged side by side in the left-right direction of the body frame small in size.

The vehicle is preferably configured such that each of the left front fender and the right front fender has an asymmetrical shape as seen from the front in the front-rear direction of the body frame under a condition that the body frame is in an upright state and that the left front wheel and the right front wheel are not turned by the steering device.

Water that is scattered by the left front wheel is significantly reduced or prevented from being scattered rearward by the left side wall portion and the left guide portion that are provided on the left of the left side surface of the left front wheel. Since the necessity of providing a similar construction on the right of the right side surface of the left front wheel is low, the degree of freedom in designing the shape of the left front fender at that location to be smaller in size is enhanced. Similarly, water that is scattered by the right front wheel is significantly reduced or prevented from being scattered rearward by the right side wall portion and the right guide portion that are provided on the right of the right side surface of the right front wheel. Since the necessity of providing a similar construction on the left of the left side surface of the right front wheel is low, the degree of freedom in designing the shape of the right front fender at that location to be smaller in size is enhanced. Consequently, it is possible to significantly reduce or prevent the generation of the phenomenon of the leg portions of the rider sitting on the seat being splashed with water scattered by the two front wheels while making the vehicle including the leanable body frame and the two front wheels that are arranged side by side in the left-right direction of the body frame smaller in size.

The vehicle preferably includes a link mechanism disposed above the left front wheel and the right front wheel in the up-down direction, and that leans the body frame to the left or right of the vehicle by changing positions of the left front wheel and the right front wheel relative to the body frame. In this case, the vehicle is preferably configured such that the link mechanism includes an upper cross member; a lower cross member disposed below the upper cross member in the up-down direction of the body frame; a left side member disposed above the left front wheel in the up-down direction of the body frame; and a right side member disposed above the right front wheel in the up-down direction of the body frame; and the upper cross member, the lower cross member, the left side member, and the right side member are connected such that the upper cross member and the lower cross member are held in postures which are parallel to each other, and that the left side member and the right side member are held in postures which are parallel to each other.

With the above configuration, when compared with a so-called double wishbone link mechanism, it is easy to arrange the components of the link mechanism within the body cover. Consequently, it is possible to significantly reduce or prevent the generation of the phenomenon of the leg portions of the rider sitting on the seat being splashed with water scattered by the two front wheels while making the vehicle including the leanable body frame and the two front wheels that are arranged side by side in the left-right direction of the body frame smaller in size.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
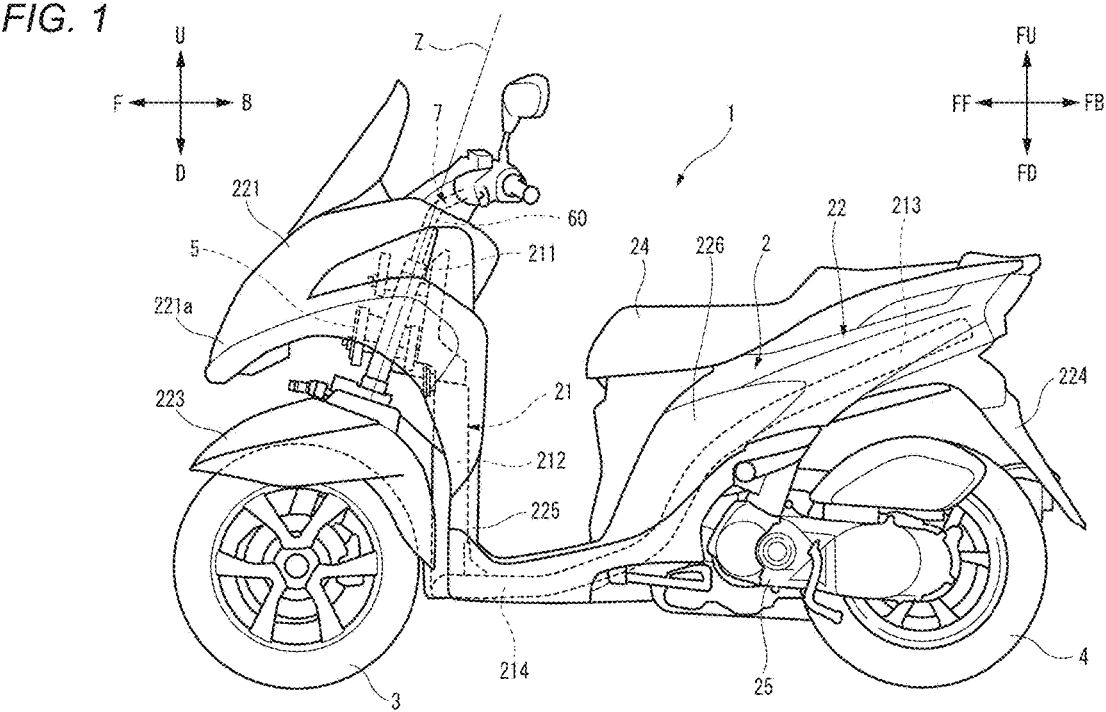
FIG. 1 is a side view of the whole a vehicle according to a preferred embodiment of the present invention, viewed from the left thereof.

Referring to the accompanying drawings, examples of the preferred embodiments of the present invention will be described in detail below.

In the accompanying drawings, an arrow F denotes a front or forward direction of a vehicle. An arrow B denotes a back/rear or backward/rearward direction of the vehicle. An arrow U denotes an up or upward direction of the vehicle. An arrow D denotes a down or downward direction of the vehicle. An arrow R denotes a right or rightward direction of the vehicle. An arrow L denotes a left or leftward direction of the vehicle.

A vehicle turns with a body frame leaning in a left-right direction of the vehicle relative to a vertical direction. Accordingly, in addition to the directions based on the vehicle, directions based on the body frame will be defined. In the accompanying drawings, an arrow FF denotes a front or forward direction of the body frame. An arrow FB denotes a back/rear or backward/rearward of the body frame. An arrow FU denotes an up or upward direction of the body frame. An arrow FD denotes a down or downward direction of the body frame. An arrow FR denotes a right or rightward direction of the body frame. An arrow FL denotes a left or leftward direction of the body frame.

In this description, a "front-rear direction of the body frame," a "left-right direction of the body frame," and an "up-down direction of the body frame" means a front-rear direction, a left-right direction, and an up-down direction based on the body frame as viewed from a rider who rides the vehicle. "A side of or sideways of the body frame" means directly on the right or left of the body frame.

In this description, an expression "something extends in the front-rear direction of the body frame" includes a situation in which something extends while being inclined in relation to the front-rear direction of the body frame and means that something extends with a gradient which is closer to the front-rear direction of the body frame rather than the left-right direction and the up-down direction of the body frame.

In this description, an expression "something extends in the left-right direction of the body frame" includes a situation in which something extends while being inclined in relation to the left-right direction of the body frame and means that something extends with a gradient which is closer to the left-right direction of the body frame rather than the front-rear direction of the body frame and the up-down direction of the body frame.

In this description, an expression "something extends in the up-down direction of the body frame" includes a situation in which something extends while being inclined in relation to the up-down direction of the body frame and means that something extends with a gradient which is closer to the up-down direction of the body frame rather than the front-rear direction of the body frame and the left-right direction of the body frame.

In this description, an expression the "body frame is in the upright state" means that the up-down direction of the body frame coincides with the vertical direction in such a state that the vehicle is not steered. In this state, the directions based on the vehicle and the directions based on the vehicle frame coincide. When the vehicle is turning with the body frame leaning in the left-right direction relative to the vertical direction, the left-right direction of the vehicle does not coincide with the left-right direction of the body frame. Additionally, the up-and-down direction of the vehicle does not coincide with the up-and-down direction of the body frame, too. However, the front-rear direction of the vehicle coincides with the front-rear direction of the body frame.

Referring to FIGS. 1 to 12, a vehicle 1 according to preferred embodiments of the present invention will be described. The vehicle 1 is a vehicle which is driven by power generated from a power source and which includes a leanable body frame and two front wheels which are arranged side by side in the left-right direction of the body frame.

FIG. 1 is a left side view wherein the whole of the vehicle 1 is viewed from the left thereof. The vehicle 1 includes a vehicle main body 2, a pair of left and right front wheels 3, a rear wheel 4, a link mechanism 5, and a steering device 7.

The vehicle main body 2 includes a body frame 21, a body cover 22, a seat 24, and a power unit 25. In FIG. 1, the body frame 21 is in an upright state. The following description which refers to FIG. 1 will be made on the premise that the body frame 21 is in the upright state.

The body frame 21 includes a head pipe 211, a down frame 212, and a rear frame 213. In FIG. 1, portions of the body frame 21 which are hidden by the body cover 22 are shown by dashed lines. The body frame 21 supports the seat 24 and the power unit 25. The power unit 25 supports the rear wheel 4. The power unit 25 includes a power source such as an engine, an electric motor, a battery or the like and a device such as a transmission. The power source produces a force by which the vehicle 1 is driven.

The head pipe 211 is disposed at a front portion of the vehicle 1. When the body frame 21 is viewed from the left thereof, an upper portion of the head pipe 211 is disposed behind a lower portion of the head pipe 211.

The down frame 212 is connected to the head pipe 211. The down frame 212 is disposed directly behind the head pipe 211. The down frame 212 extends in the up-down direction of the body frame 21.

The rear frame 213 is disposed directly behind the down frame 212. The rear frame 213 extends in the front-rear direction of the body frame 21. The rear frame 213 supports the seat 24 and the power unit 25.

The body cover 22 includes a front cover 221, a pair of left and right front fenders 223, a rear fender 224, and an inner fender 225. The body cover 22 is a body portion which covers at least partially body portions which are mounted on the vehicle 1 such as the pair of left and right front wheels 3, the body frame 21, the link mechanism 5 and the like.

The front cover 221 is disposed ahead of the seat 24. The front cover 221 covers at least partially the link mechanism 5 and the steering device 7.

At least portions of the pair of left and right front fenders 223 are disposed directly below the front cover 221. At least the portions of the pair of left and right front fenders 223 are disposed directly above the pair of left and right front wheels 3, respectively.

At least a portion of the rear fender 224 is disposed directly above the rear wheel 4.

The inner fender 225 is disposed in a position where the leg shield 225 covers at least partially the legs of the rider. The inner fender 225 is disposed behind the pair of left and right front wheels 3 and ahead of the seat 24.

At least portions of the pair of left and right front wheels 3 are disposed directly below the head pipe 211. At least portions of the pair of left and right front wheels 3 are disposed directly below the front cover 221.

At least a portion of the rear wheel 4 is disposed below the seat 24. At least a portion of the rear wheel 4 is disposed directly below the rear fender 224.

Figure 2:
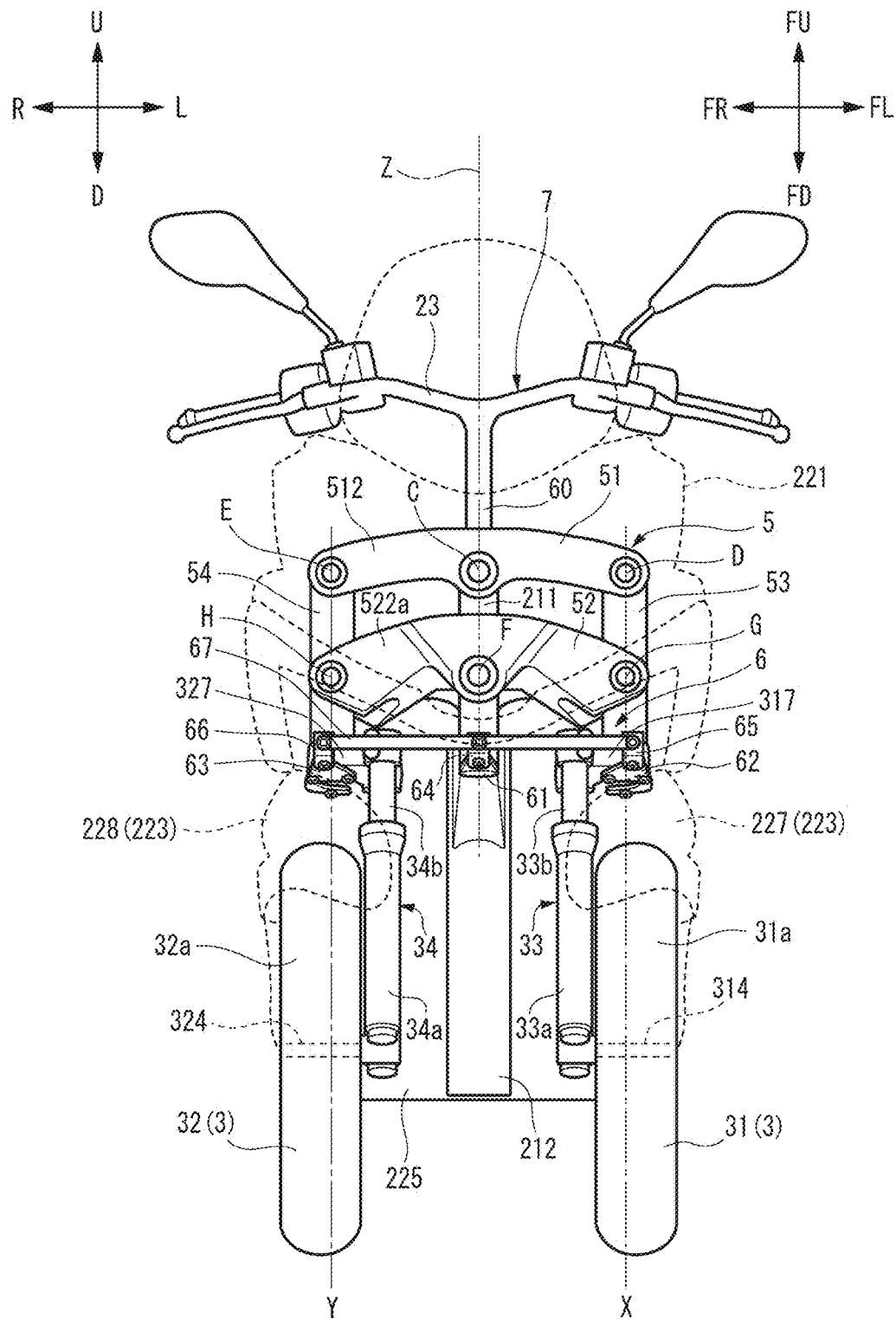
FIG. 2 is a front view showing a front portion of the vehicle of FIG. 1.

FIG. 2 is a front view of the front portion of the vehicle 1 as viewed from the front of the body frame 21. In FIG. 2, the body frame 21 is in the upright state. The following description which refers to FIG. 2 will be made on the premise that the body frame 21 is in the upright state. In FIG. 2, those elements shown therein are depicted as being seen through the front cover 221 and the pair of left and right front fenders 223 which are shown by dashed lines.

The pair of left and right front wheels 3 include a left front wheel 31 and a right front wheel 32. The left front wheel 31 is disposed on the left of the head pipe 211 which defines a portion of the body frame 21. The right front wheel 32 is disposed on the right of the head pipe 211. The left front wheel 31 and the right front wheel 32 are arranged side by side in the left-right direction of the body frame 21.

The steering device 7 includes a left shock absorbing mechanism 33, a right shock absorbing mechanism 34, a left bracket 317, and a right bracket 327.

The left shock absorbing mechanism 33 includes a left outer tube 33a. The left outer tube 33a supports the left front wheel 31. The left outer tube 33a extends in the up-down direction of the body frame 21. The left outer tube 33a includes a left supporting axle 314 at a lower end portion thereof. The left front wheel 31 is supported by the left supporting axle 314.

The left shock absorbing mechanism 33 includes a left inner tube 33b. The left inner tube 33b extends in the up-down direction of the body frame 21. The left inner tube 33b is disposed directly above the left outer tube 33a in such a state that a portion of the left inner tube 33b is inserted in the left outer tube 33a. An upper portion of the left inner tube 33b is fixed to the left bracket 317.

The left shock absorbing mechanism 33 preferably is a so-called telescopic shock absorbing mechanism. The left inner tube 33b moves relatively to the left outer tube 33a in a direction in which the left outer tube 33a extends, so that the left shock absorbing mechanism 33 is allowed to extend and contract in the extending direction of the left outer tube 33a. This enables the left shock absorbing mechanism 33 to absorb a displacement of the left front wheel 31 relative to the left inner tube 33b in the up-down direction of the body frame 21.

The left outer tube 33a and the left inner tube 33b define a pair of telescopic elements which are arranged side by side in the front-rear direction of the body frame 21.

The right shock absorbing mechanism 34 includes a right outer tube 34a. The right outer tube 34a supports the right front wheel 32. The right outer tube 34a extends in the up-down direction of the body frame 21. The right outer tube 34a includes a right supporting axle 324 at a lower end portion thereof. The right front wheel 32 is supported by the right supporting axle 324.

The right shock absorbing mechanism 34 includes a right inner tube 34b. The right inner tube 34b extends in the up-down direction of the body frame 21. The right inner tube 34b is disposed directly above the right outer tube 34a in such a state that a portion thereof is inserted in the right outer tube 34a. An upper portion of the right inner tube 34b is connected to a right bracket 327.

The right shock absorbing mechanism 34 preferably is a so-called telescopic shock absorbing mechanism. The right inner tube 34b moves relatively to the right outer tube 34a in a direction in which the right outer tube 34a extends, so that the right shock absorbing mechanism 34 is allowed to extend and contract in the extending direction of the right outer tube 34a. This enables the right shock absorbing mechanism 34 to absorb a displacement of the right front wheel 32 relative to the right inner tube 34b in the up-down direction of the body frame 21.

The right outer tube 34a and the right inner tube 34b define a pair of telescopic elements which are arranged side by side in the front-rear direction of the body frame 21.

The steering device 7 includes a steering force transmitting mechanism 6. The steering force transmitting mechanism 6 includes a handlebar 23 and a steering shaft 60. The handlebar 23 is attached to an upper portion of the steering shaft 60. A portion of the steering shaft 60 is turnably supported on the head pipe 211. A central turning axis Z of the steering shaft 60 extends in the up-down direction of the body frame 21. As shown in FIG. 1, the upper portion of the steering shaft 60 is disposed behind a lower portion thereof. Consequently, the central turning axis Z of the steering shaft 60 is inclined in the front-rear direction of the body frame 21. The steering shaft 60 turns about the central turning axis Z in response to the rider operating the handlebar 23.

The steering force transmitting mechanism 6 transmits a steering force with which the rider operates the handlebar 23 to the left bracket 317 and the right bracket 327. A specific configuration thereof will be described in detail below.

In the vehicle 1 according to the above preferred embodiment, the link mechanism 5 preferably uses a four parallel joint link system (also referred to as a parallelogram link).

As shown in FIG. 2, the link mechanism 5 is disposed below the handlebar 23. The link mechanism 5 is disposed above the left front wheel 31 and the right front wheel 32. The link mechanism 5 includes an upper cross member 51, a lower cross member 52, a left side member 53, and a right side member 54. The link mechanism 5 never turns about the central turning axis Z relative to the body frame 21 irrespective of the turning of the steering shaft 60 turns about the central turning axis Z in association with the operation of the handlebar 23.

The upper cross member 51 includes a plate member 512. The plate member 512 is disposed directly ahead of the head pipe 211. The plate member 512 extends in the left-right direction of the body frame 21.

An intermediate portion of the upper cross member 51 is supported on the head pipe 211 by a support portion C. The upper cross member 51 turns relative to the head pipe 211 about an intermediate upper axis which passes through the support portion C and extends in the front-rear direction of the body frame 21.

A left end portion of the upper cross member 51 is supported on the left side member 53 by a support portion D. The upper cross member 51 turns relative to the left side member 53 about a left upper axis which passes through the support portion D and extends in the front-rear direction of the body frame 21.

A right end portion of the upper cross member 51 is supported on the right side member 54 by a support portion E. The upper cross member 51 turns relative to the right side member 54 about a right upper axis which passes through the support portion E and extends in the front-rear direction of the body frame 21.

Figure 3:
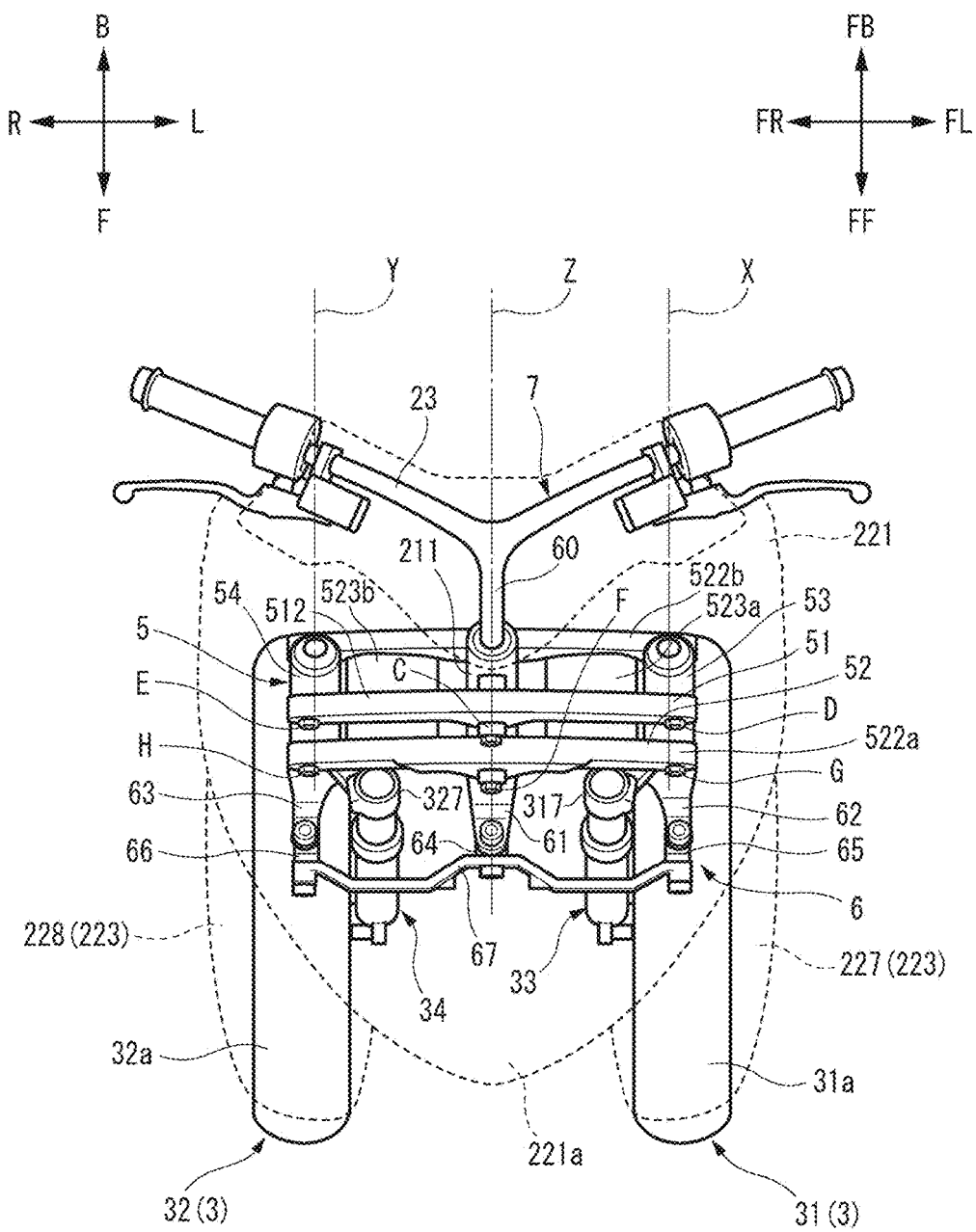
FIG. 3 is a plan view showing the front portion of the vehicle of FIG. 1.

FIG. 3 is a plan view of the front portion of the vehicle 1 as viewed from above the body frame 21. In FIG. 3, the body frame 21 is in the upright state. The following description which refers to FIG. 3 will be made on the premise that the body frame 21 is in the upright state. In FIG. 3, those elements shown therein are depicted as being seen through the front cover 221 and the pair of front fenders 223 which are shown by dashed lines.

As shown in FIG. 3, the lower cross member 52 includes a front plate member 522a and a rear plate member 522b. The front plate member 522a is disposed directly ahead of the head pipe 211. The rear plate member 522b is disposed directly behind the head pipe 211. The front plate member 522a and the rear plate member 522b extend in the left-right direction of the body frame 21. The front plate member 522a and the rear plate member 522b are connected together by the left connecting block 523a and the right connecting block 523b. The left connecting block 523a is disposed on the left of the head pipe 211. The right connecting block 523b is disposed on the right of the head pipe 211.

The lower cross member 52 is disposed below the upper cross member 51. A lengthwise dimension of the lower cross member 52 in relation to the left-right direction of the body frame 21 is exactly or almost the same as a lengthwise dimension of the upper cross member 51 in relation to the left-right direction of the body frame 21. The lower cross member 52 extends parallel to the upper cross member 51.

An intermediate portion of the lower cross member 52 is supported on the head pipe 211 by a support portion F. The lower cross member 52 turns about an intermediate lower axis which passes through the support portion F and extends in the front-rear direction of the body frame 21.

A left end portion of the lower cross member 52 is supported on the left side member 53 by a support portion G. The lower cross member 52 turns about a left lower axis which passes through the support portion G and extends in the front-rear direction of the body frame 21.

A right end portion of the lower cross member 52 is supported on the right side member 54 by a support portion H. The lower cross member 52 turns about a right lower axis which passes through the support portion H and extends in the front-rear direction of the body frame 21.

The intermediate upper axis, the right upper axis, the left upper axis, the intermediate lower axis, the right lower axis, and the left lower axis extend parallel to one another. The intermediate upper axis, the right upper axis, the left upper axis, the intermediate lower axis, the right lower axis, and the left lower axis are disposed above the left front wheel 31 and the right front wheel 32.

As shown in FIGS. 2 and 3, the left side member 53 is disposed directly on the left of the head pipe 211. The left side member 53 is disposed above the left front wheel 31. The left side member 53 extends in a direction in which the head pipe 211 extends. The left side member 53 extends in a direction in which the central turning axis Z of the steering shaft 60 extends. An upper portion of the left side member 53 is disposed behind a lower portion thereof.

The lower portion of the left side member 53 is connected to the left bracket 317. The left bracket 317 turns about a left center axis X relative to the left side member 53. The left center axis X extends in a direction in which the left side member 53 extends. As shown in FIG. 2, the left center axis X extends parallel to the central turning axis Z of the steering shaft 60 in the up-down direction of the body frame 21. As shown in FIG. 3, the left center axis X extends parallel to the central turning axis Z of the steering shaft 60 in the front-rear direction of the body frame 21.

As shown in FIGS. 2 and 3, the right side member 54 is disposed directly on the right of the head pipe 211. The right side member 54 is disposed above the right front wheel 32. The right side member 54 extends in the direction in which the head pipe 211 extends. The right side member 54 extends in the direction in which the central turning axis Z of the steering shaft 60 extends. An upper portion of the right side member 54 is disposed behind a lower portion thereof.

A lower portion of the right side member 54 is connected to the right bracket 327. The right bracket 327 turns about a right center axis Y relative to the right side member 54. The right center axis Y extends in a direction in which the right side member 54 extends. As shown in FIG. 2, the right center axis Y extends parallel to the central turning axis Z of the steering shaft 60 in the up-down direction of the body frame 21. As shown in FIG. 3, the right center axis Y extends parallel to the central turning axis Z of the steering shaft 60 in the front-rear direction of the body frame 21.

Thus, as has been described above, the upper cross member 51, the lower cross member 52, the left side member 53, and the right side member 54 are supported on the body frame 21 so that the upper cross member 51 and the lower cross member 52 are held in postures which are parallel to each other and so that the left side member 53 and the right side member 54 are held in postures which are parallel to each other.

As shown in FIGS. 2 and 3, the steering force transmitting mechanism 6 includes, in addition to the handlebar 23 and the steering shaft 60 which have been described above, an intermediate transmission plate 61, a left transmission plate 62, a right transmission plate 63, an intermediate joint 64, a left joint 65, a right joint 66, and a tie rod 67.

The intermediate transmission plate 61 is connected to the lower portion of the steering shaft 60. The intermediate transmission plate 61 cannot turn relatively to the steering shaft 60. The intermediate transmission plate 61 turns about the intermediate turning axis Z of the steering shaft 60 relative to the head pipe 211. A front portion of the intermediate transmission plate 61 is narrower in relation to a width in the left-right direction of the body frame 21 than a rear portion thereof.

The left transmission plate 62 is disposed directly on the left of the intermediate transmission plate 61. The left transmission plate 62 is connected to a lower portion of the left bracket 317. The left transmission plate 62 cannot turn relative to the left bracket 317. The left transmission plate 62 turns about the left center axis X relative to the left side member 53. A front portion of the left transmission plate 62 is narrower in relation to a width in the left-right direction of the body frame 21 than a rear portion thereof.

The right transmission plate 63 is disposed directly on the right of the intermediate transmission plate 61. The right transmission plate 63 is connected to a lower portion of the right bracket 327. The right transmission plate 63 cannot turn relatively to the right bracket 327. The right transmission plate 63 turns about the right center axis Y relative to the right side member 54. A front portion of the right transmission plate 63 is narrower in relation to a width in the left-right direction of the body frame 21 than a rear portion thereof.

As shown in FIG. 3, the intermediate joint 64 is connected to the front portion of the intermediate transmission plate 61 via a shaft which extends in the up-down direction of the body frame 21. The intermediate transmission plate 61 and the intermediate joint 64 turns relatively about the shaft portion. The left joint 65 is disposed directly on the left of the intermediate joint 64. The left joint 65 is connected to the front portion of the left transmission plate 62 via a shaft which extends in the up-down direction of the body frame. The left transmission plate 62 and the left joint 65 turns relatively about the shaft portion. The right joint 66 is disposed directly on the right of the intermediate joint 64. The right joint 66 is connected to the front portion of the right transmission plate 63 via a shaft which extends in the up-down direction of the body frame. The right transmission plate 63 and the right joint 66 turns relatively about the shaft portion.

A shaft portion which extends in the front-rear direction of the body frame 21 is provided at a front portion of the intermediate joint 64. A shaft portion which extends in the front-rear direction of the body frame 21 is provided at a front portion of the left joint 65. A shaft portion which extends in the front-rear direction of the body frame 21 is provided at a front portion of the right joint 66. The tie rod 67 extends in the left-right direction of the body frame 21. The tie rod 67 is connected to the intermediate joint 64, the left joint 65 and the right joint 66 via those shaft portions.

The tie rod 67 and the intermediate joint 64 turns relatively about the shaft portion which is provided at the front portion of the intermediate joint 64. The tie rod 67 and the left joint 65 turns relatively about the shaft portion which is provided at the front portion of the left joint 65. The tie rod 67 and the right joint 66 turns relatively about the shaft portion which is provided at the front portion of the right joint 66.

Figure 4:
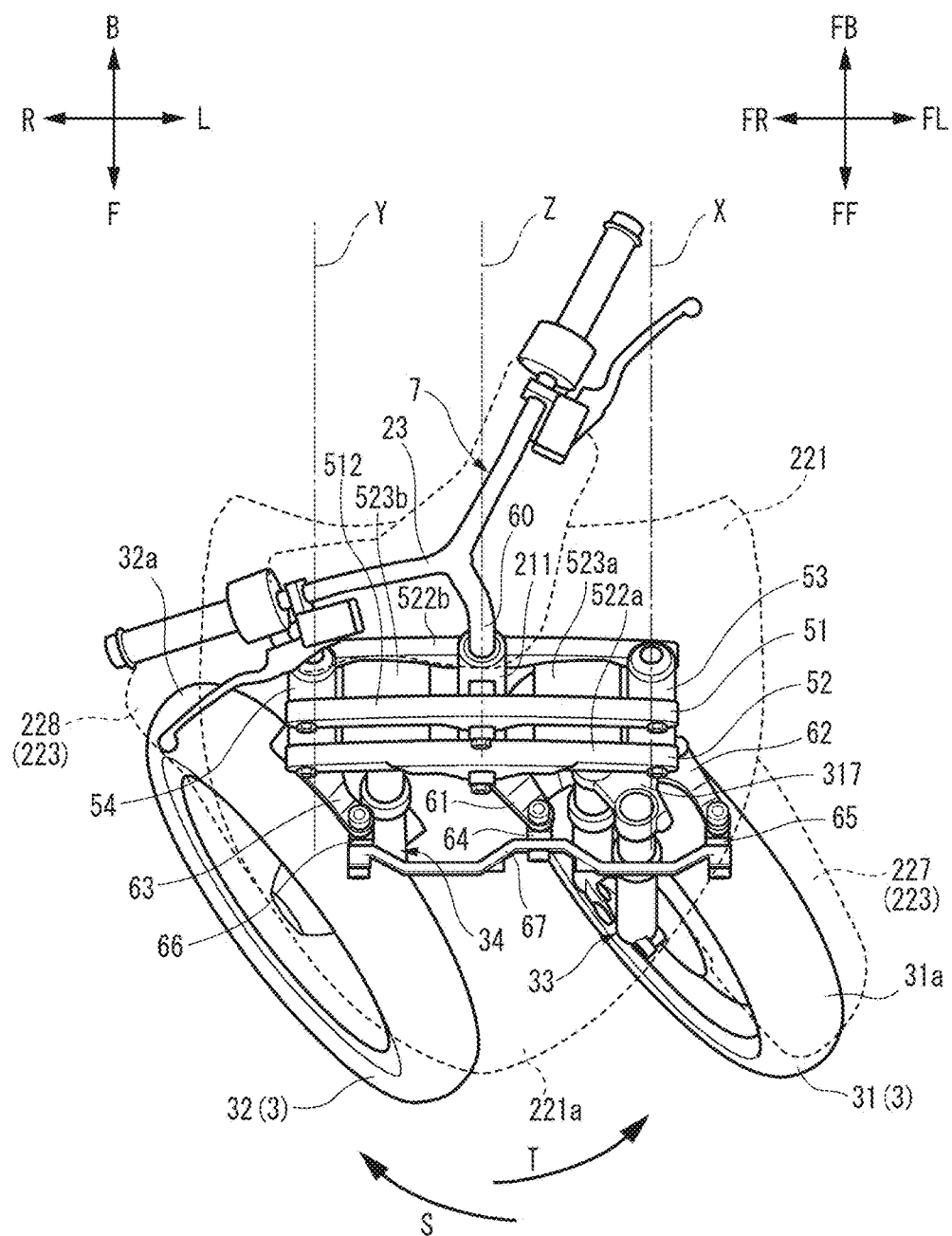
FIG. 4 is a plan view showing the front portion of the vehicle shown in FIG. 1 when the vehicle is steered.

Next, referring to FIGS. 3 and 4, a steering operation of the vehicle 1 will be described. FIG. 4 is a plan view of the front portion of the vehicle 1 under a condition that the left front wheel 31 and the right front wheel 32 are turned to the left, as viewed from above the body frame 21. In FIG. 4, those elements shown therein are depicted as being seen through the front cover 221 and the pair of front fenders 223 which are shown by dashed lines.

When the rider operates the handlebar 23, the steering shaft 60 turns about the central turning axis Z relative to the head pipe 211. When the handlebar 23 is turned to the left as shown in FIG. 4, the steering shaft 60 turns in a direction indicated by an arrow T. In association with the turn of the steering shaft 60, the intermediate transmission plate 61 turns in the direction indicated by the arrow T about the central turning axis Z relative to the head pipe 211.

In association with the turning of the intermediate transmission plate 61 in the direction indicated by the arrow T, the intermediate joint 64 of the tie rod 67 turns relative to the intermediate transmission plate 61 in a direction indicated by an arrow S. This moves the tie rod 67 rightwards and rearwards with its posture maintained as it is.

In association with the rightward and rearward movement of the tie rod 67, the left joint 65 and the right joint 66 of the tie rod 67 turn in the direction indicated by the arrow S relative to the left transmission plate 62 and the right transmission plate 63, respectively. This causes the left transmission plate 62 and the right transmission plate 63 to turn in the direction indicated by the arrow T while the tie rod 67 maintains its posture as it is.

When the left transmission plate 62 turns in the direction indicated by the arrow T, the left bracket 317, which cannot turn relative to the left transmission plate 62, turns in the direction indicated by the arrow T about the left center axis X relative to the left side member 53.

When the right transmission plate 63 turns in the direction indicated by the arrow T, the right bracket 327, which cannot turn relative to the right transmission plate 63, turns in the direction indicated by the arrow T about the right center axis Y relative to the right side member 54.

When the left bracket 317 turns in the direction indicated by the arrow T, the left shock absorbing mechanism 33, which is connected to the left bracket 317 via the left inner tube 33b, turns in the direction indicated by the arrow T about the left center axis X relative to the left side member 53. When the left shock absorbing mechanism 33 turns in the direction indicated by the arrow T, the left front wheel 31, which is supported on the left shock absorbing mechanism 33 via the left supporting axle 314, turns in the direction indicated by the arrow T about the left center axis X relative to the left side member 53.

When the right bracket 327 turns in the direction indicated by the arrow T, the right shock absorbing mechanism 34, which is connected to the right bracket 327 via the right inner tube 34b, turns in the direction indicated by the arrow T about the right center axis Y relative to the right side member 54. When the right shock absorbing mechanism 34 turns in the direction indicated by the arrow T, the right front wheel 32, which is supported on the right shock absorbing mechanism 34 via the right supporting axle 324, turns in the direction indicated by the arrow T about the right center axis Y relative to the right side member 54.

When the rider operates the handlebar 23 so as to turn to the right, the elements described above turn in the direction indicated by the arrow S. Since the elements move the other way around in relation to the left-right direction, the detailed description thereof will be omitted here.

Thus, as has been described above, the steering force transmitting mechanism 6 transmits the steering force to the left front wheel 31 and the right front wheel 32 in response to the operation of the handlebar 23 by the rider. The left front wheel 31 and the right front wheel 32 turn about the left center axis X and the right center axis Y, respectively, in the direction corresponding to the direction in which the handlebar 23 is operated by the rider.

Figure 5:
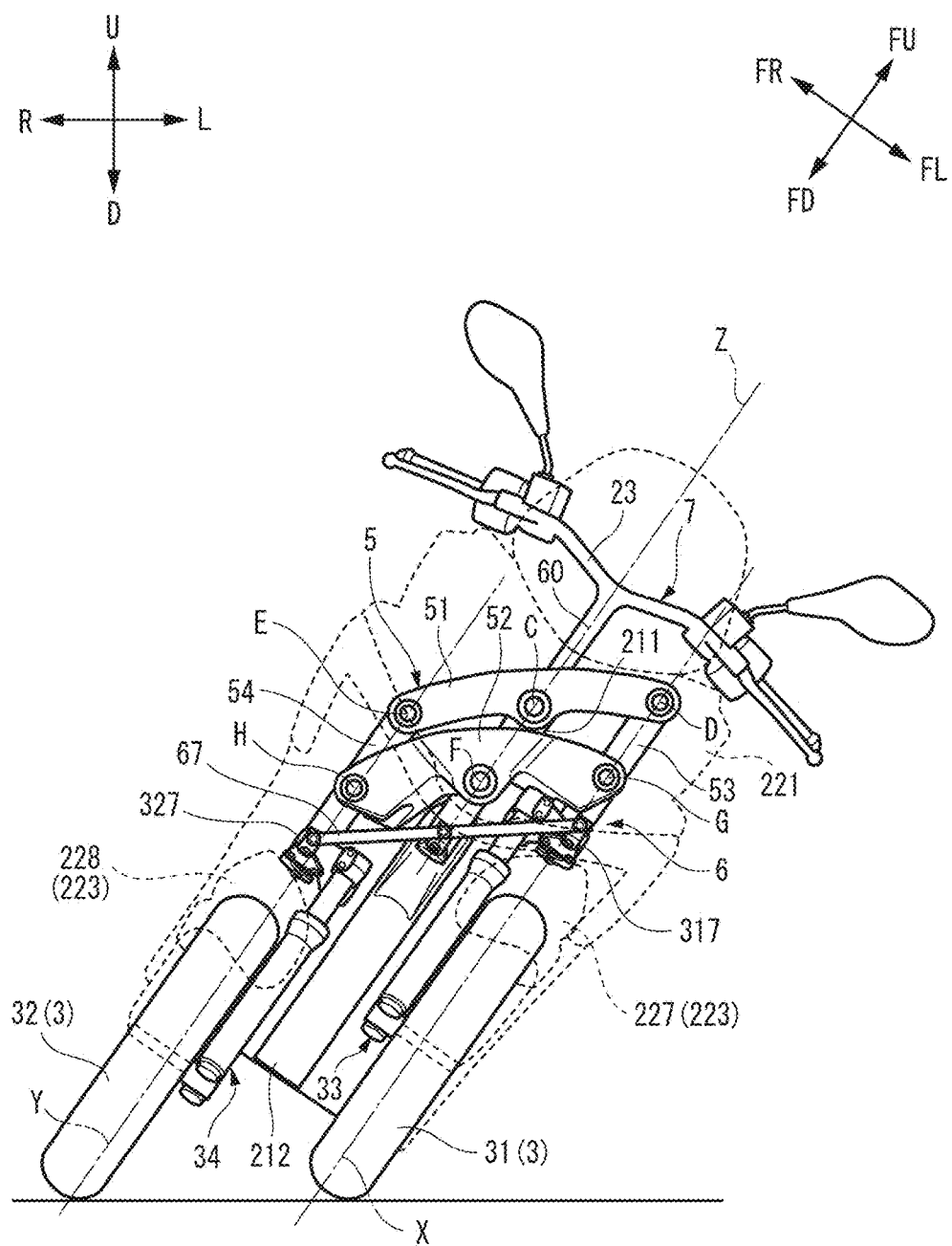
FIG. 5 is a front view showing the front portion of the vehicle shown in FIG. 1 when the vehicle is caused to lean.

Next, referring to FIGS. 2 and 5, a leaning operation of the vehicle 1 will be described. FIG. 5 is a front view of the front portion of the vehicle 1 as viewed from the front of the body frame 21 when the body frame 21 leans to the left of the vehicle 1. In FIG. 5, those elements shown therein are depicted as being seen through the front cover 221 and the pair of front fenders 223 which are shown by dashed lines.

As shown in FIG. 2, when the body frame 21 is in the upright state, when the vehicle 1 is viewed from the front of the body frame 21, the link mechanism 5 preferably has a rectangular or a substantially rectangular shape. As shown in FIG. 5, with the body frame 21 leaning, when the vehicle 1 is viewed from the front of the body frame 21, the link mechanism 5 has a parallelogram shape. The deformation of the link mechanism 5 is associated with the leaning of the body frame 21 in the left-right direction of the vehicle 1. The operation of the link mechanism 5 means that the upper cross member 51, the lower cross member 52, the left side member 53, and the right side member 54 which define the link mechanism 5 turn relatively about the turning axes which pass through the corresponding support portions C to H, so that the shape of the link mechanism 5 changes.

For example, as shown in FIG. 5, when the rider causes the vehicle 1 to lean to the left, the head pipe 211 leans to the left from the vertical direction. When the head pipe 211 leans, the upper cross member 51 turns about the intermediate upper axis which passes through the support portion C counterclockwise as viewed from the front of the vehicle 1 relative to the head pipe 211. Similarly, the lower cross member 52 turns about the intermediate lower axis which passes through the support portion F counterclockwise as viewed from the front of the vehicle 1 relative to the head pipe 211. This causes the upper cross member 51 to move to the left relative to the lower cross member 52.

As the upper cross member 51 moves to the left, the upper cross member 51 turns about the left upper axis which passes through the support portion D and the right upper axis which passes through the support portion E counterclockwise as viewed from the front of the vehicle 1 relative to the left side member 53 and the right side member 54, respectively. Similarly, the lower cross member 52 turns about the left lower axis which passes through the support portion G and the right lower axis which passes through the support portion H counterclockwise as viewed from the front of the vehicle 1 relative to the left side member 53 and the right side member 54, respectively. This causes the left side member 53 and the right side member 54 to lean to the left from the vertical direction while holding their postures parallel to the head pipe 211.

As this occurs, the lower cross member 52 moves to the left relative to the tie rod 67. As the lower cross member 52 moves to the left, the shaft portions which are provided at the respective front portions of the intermediate joint 64, the left joint 65 and the right joint 66 turn relative to the tie rod 67. This allows the tie rod 67 to hold a parallel posture to the upper cross member 51 and the lower cross member 52.

As the left side member 53 leans to the left, the left bracket 317 which is connected to the left side member 53 leans to the left. As the left bracket 317 leans to the left, the left shock absorbing mechanism 33 which is connected to the left bracket 317 leans to the left. As the left shock absorbing mechanism 33 leans to the left, the left front wheel 31 supported on the left shock absorbing mechanism 33 leans to the left while holding its posture parallel to the head pipe 211.

As the right side member 54 leans to the left, the right bracket 327 which is connected to the right side member 54 leans to the left. As the right bracket 327 leans to the left, the right shock absorbing mechanism 34 which is connected to the right bracket 327 leans to the left. As the right shock absorbing mechanism 34 leans to the left, the right front wheel 32 supported on the right shock absorbing mechanism 34 leans to the left while holding its posture parallel to the head pipe 211.

The leaning operations of the left front wheel 31 and the right front wheel 32 are described based on the vertical direction. However, when the vehicle 1 leans (when the link mechanism 5 is activated to operate), the up-down direction of the body frame 21 does not coincide with the vertical direction. In the event that the leaning operations are described based on the up-down direction of the body frame 21, when the link mechanism 5 is activated to operate, the relative positions of the left front wheel 31 and the right front wheel 32 to the body frame 21 change. In other words, the link mechanism 5 changes the relative positions of the left front wheel 31 and the right front wheel 32 to the body frame 21 in the up-down direction of the body frame 21 to cause the body frame 21 to lean relative to the vertical direction.

When the rider causes the vehicle 1 to lean to the right, the elements lean to the right. Since the elements move the other way around in relation to the left-right direction, the detailed description thereof will be omitted here.

Figure 6:
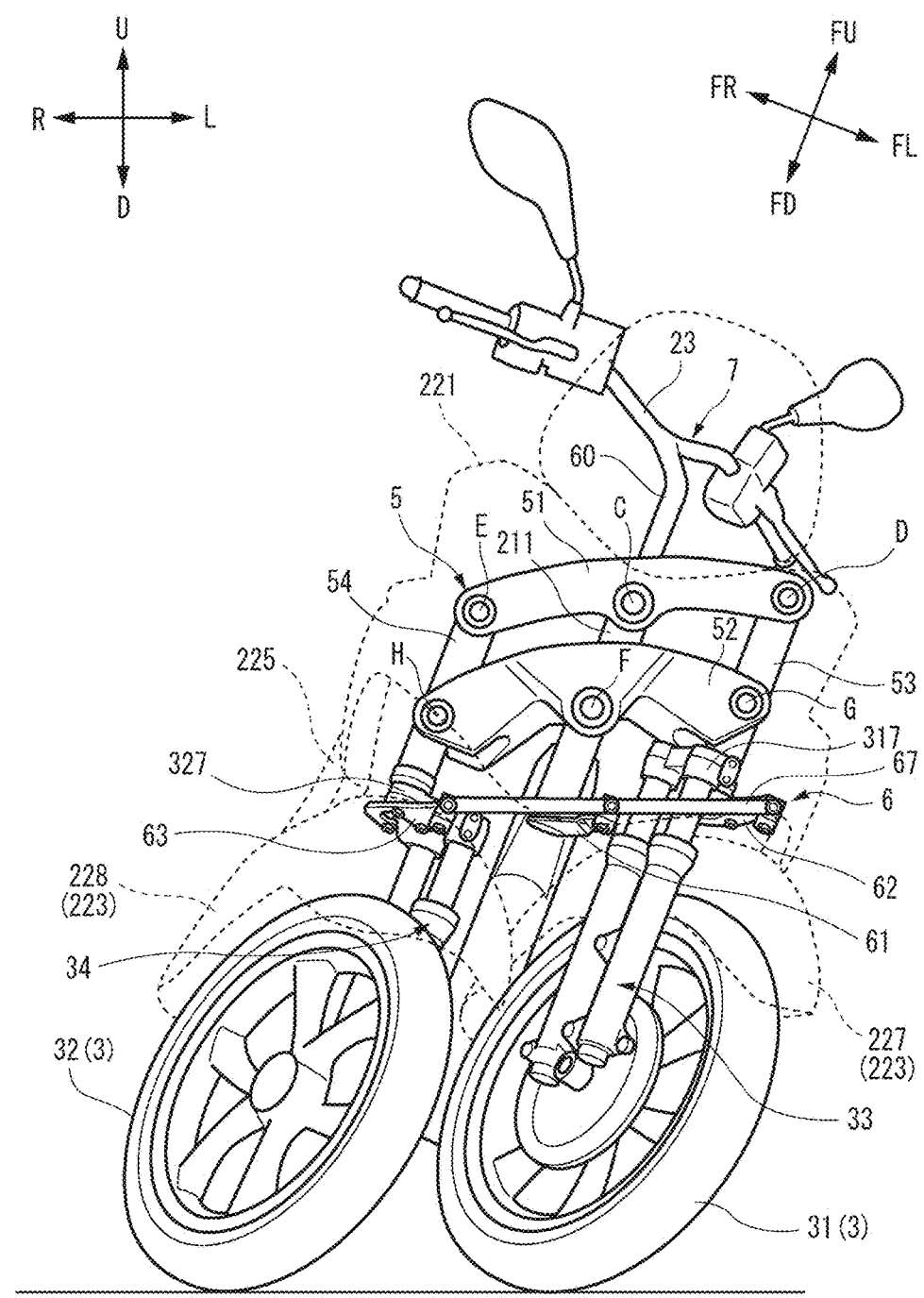
FIG. 6 is a front view showing the front portion of the vehicle shown in FIG. 1 when the vehicle is caused to lean and is steered.

FIG. 6 is a front view of the front portion of the vehicle with the vehicle 1 caused to lean and steered. FIG. 6 shows a state in which the vehicle 1 is steered or turned to the left while leaning to the left. As a result of this steering operation, the left front wheel 31 and the right front wheel 32 are turned to the left, and as a result of the leaning operation, the left front wheel 31 and the right front wheel 32 lean to the left together with the body frame 21. Namely, in this state, the link mechanism 5 exhibits the parallelogram shape, and the tie rod 67 moves toward the left rear from its position which it takes when the body frame 21 is in the upright state.

Next, the pair of front fenders 223 that the vehicle 1 includes will be described in detail. As shown in FIGS. 2 to 4, the vehicle 1 includes the left front fender 227 and the right front fender 228 that are arranged side by side in the left-right direction of the body frame 21. The left front fender 227 and the right front fender 228 are preferably made from a synthetic resin or the like.

The left front fender 227 is provided so as to turn together with the left front wheel 31. The left front fender 227 covers at least an upper surface 31*a* of the left front wheel 31. Here, the "upper surface 31*a* of the left front wheel 31" means an outer circumferential surface of the left front wheel 31 that is located above the left supporting axle 314 in the up-down direction of the body frame 21.

The right front fender 228 is provided so as to turn together with the right front wheel 32. The right front fender 228 covers at least a portion of an upper surface 32*a* of the right front wheel 32. Here, the "upper surface 32*a* of the right front wheel 32" means an outer circumferential surface of the right front wheel 32 that is located above the right supporting axle 324 in the up-down direction of the body frame 21.

Figure 7:
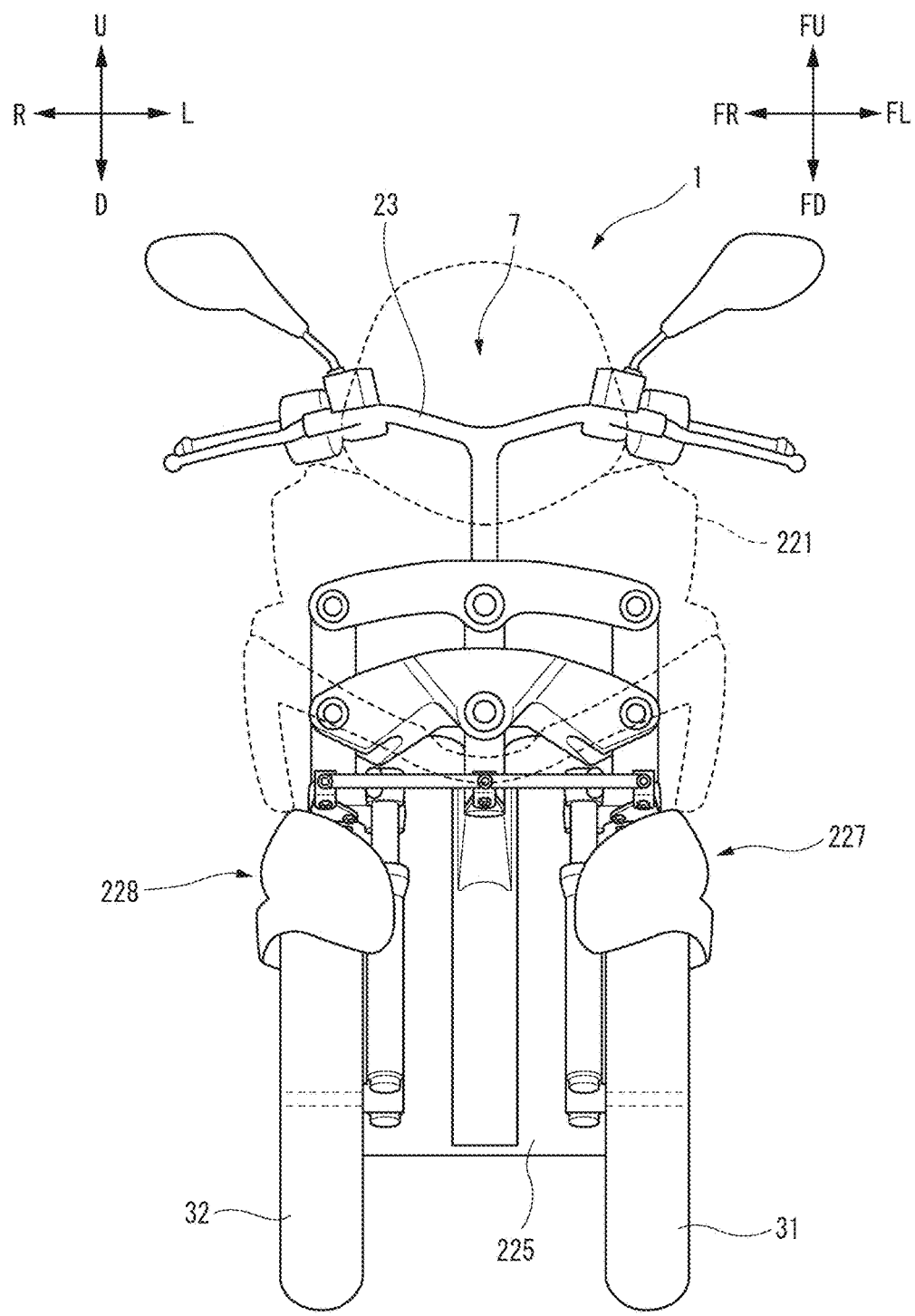
FIG. 7 is a front view schematically showing positional relationships of a left front fender and a right front fender relative to a front cover, which are included in the vehicle of FIG. 1.
Figure 8:
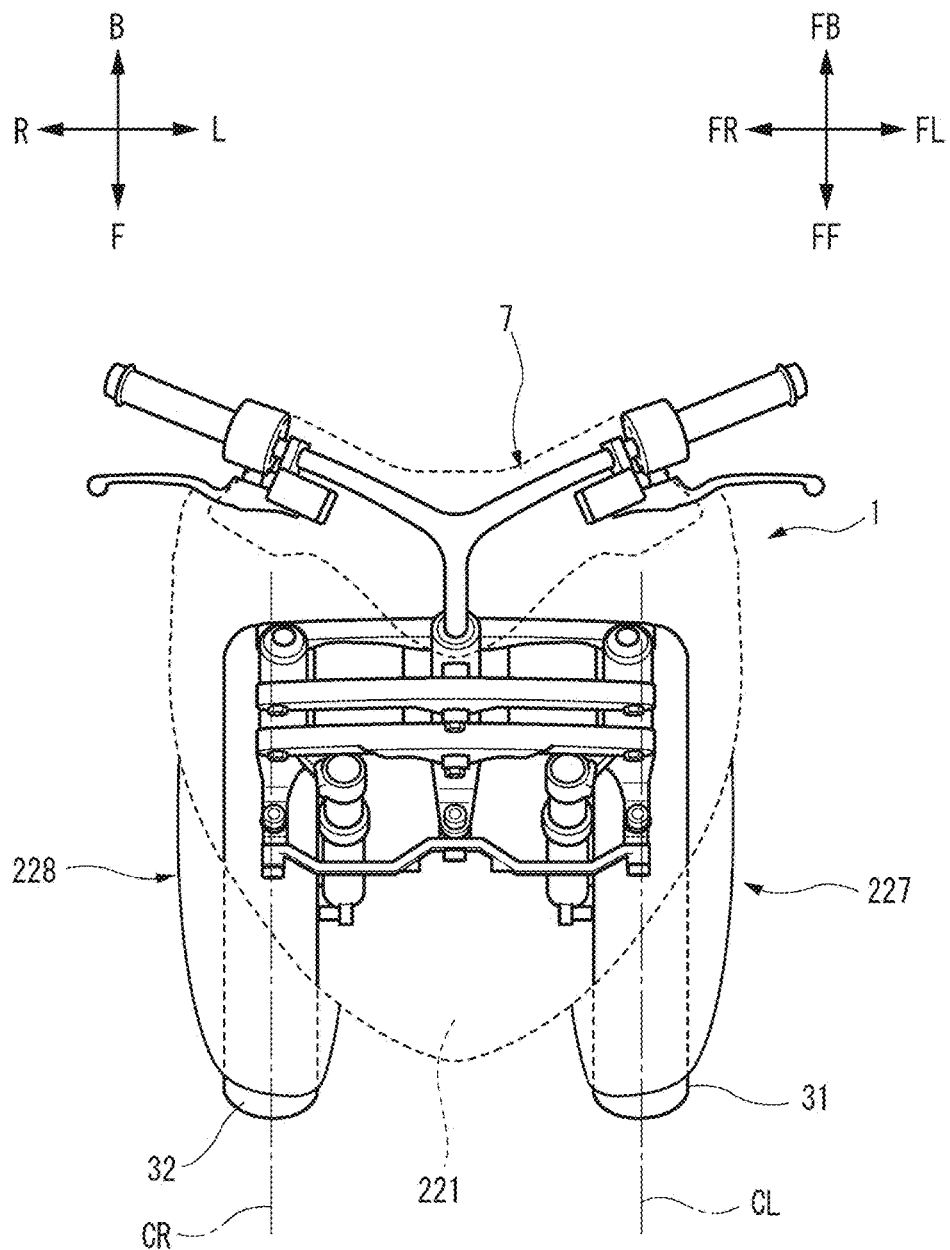
FIG. 8 is a plan view schematically showing the positional relationship of the left front fender and the right front fender relative to the front cover.

FIGS. 7 and 8 shows schematically positional relationships of the left front fender 227 and the right front fender 228 relative to the front cover 221. FIG. 7 is a front view of the front portion of the vehicle 1 as seen from the front in the front-rear direction of the body frame 21. FIG. 7 shows a state as seen through the front cover 221 indicated by dashed lines. FIG. 8 is a plan view of the front portion of the vehicle 1 as seen from above relative to the up-down direction of the body frame 21. FIG. 8 shows a state in which a portion of the left front fender 227 and a portion of the right front fender 228 that are positioned directly below the front cover 221 that is indicated by dashed lines are seen as through the front cover 221. FIGS. 7 and 8 show a state in which the body frame 21 is in the upright state and the left front wheel 31 and the right front wheel 32 are not turned by the steering device 7. When referred to herein, the "state in which the left front wheel 31 and the right front wheel 32 are not turned" means a state in which the orientation of a straight line CL that passes through a front end and a rear end of the left front wheel 31 and the orientation of a straight line CR that passes through a front end and a rear end of the right front wheel 32 shown in FIG. 8 coincide with the front-rear direction of the body frame 21. In other words, the "state in which the left front wheel 31 and the right front wheel 32 are not turned" is the state of the left front wheel 31 and the right front wheel 32 when the vehicle travels straight ahead. However, this state does not define whether the vehicle is moving or is stopped. This state includes not only a case where the vehicle is moving but also a case where the vehicle is stopped. The following description that refers to FIGS. 7 and 8 will be made based on this state.

Next, referring to FIGS. 9 to 12, a specific shape of the left front fender 227 and the right front mudguard 228 will be described.

Figure 9:
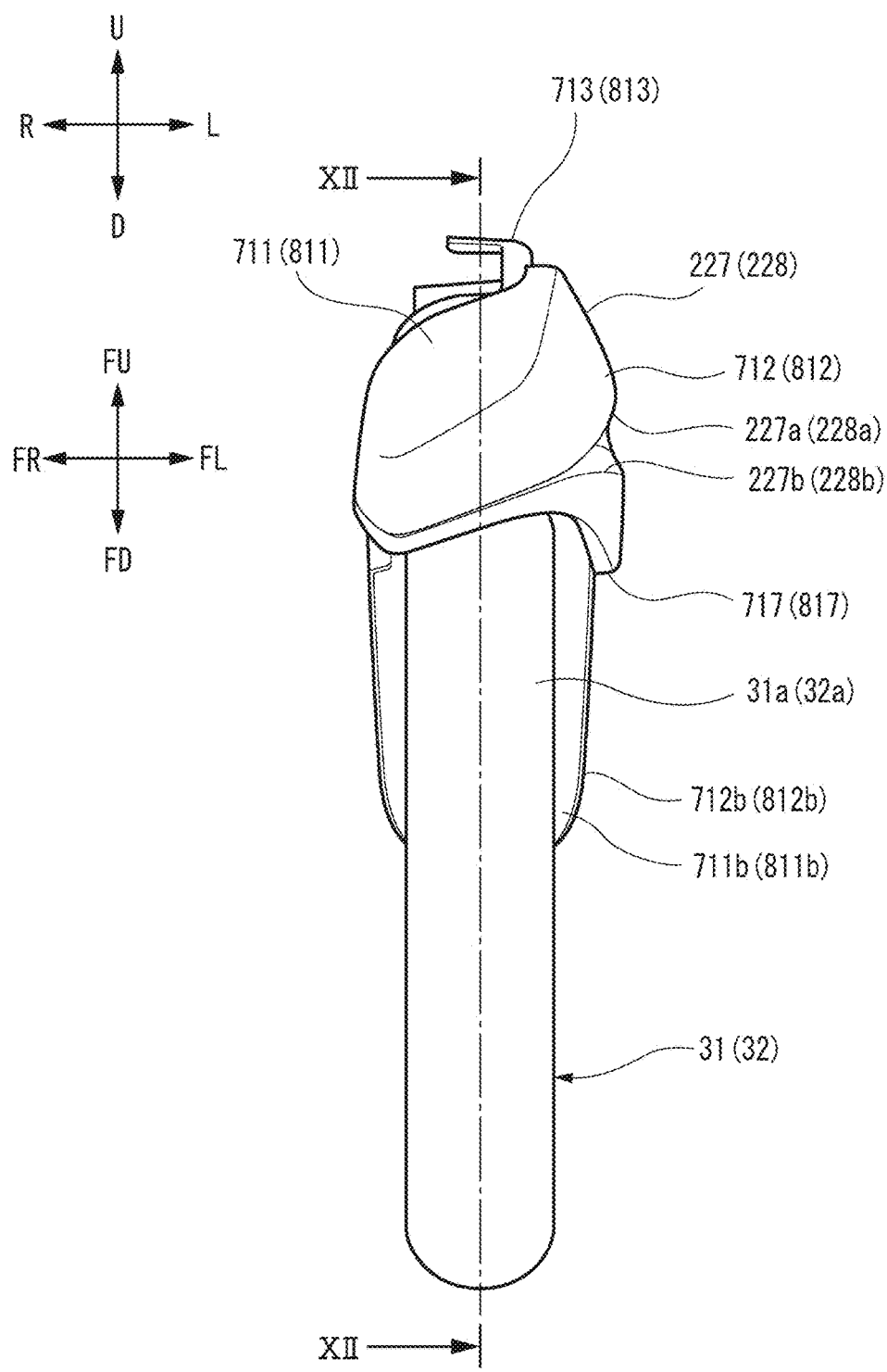
FIG. 9 is a front view showing an appearance of the left front fender.

FIG. 9 shows a view of appearances of the left front wheel 31 and the left front fender 227 as seen from the front in the front-rear direction of the body frame 21 in the state shown in FIGS. 7 and 8. Namely, FIG. 9 shows a state in which the not-shown body frame 21 is in the upright state and the left front wheel 31 is not turned by the steering device 7. The following description that refers to FIG. 9 will be made based on this state. The right front wheel 32 and the right front fender 228 are preferably symmetrical with the left front wheel 31 and the left front fender 227 relative to the left-right direction. Thus, corresponding reference numbers of the right front wheel 32 and the right front fender 228 are added in parentheses to those of the left front wheel 31 and the left front fender 227 and the description thereof will be omitted.

Figure 10A:
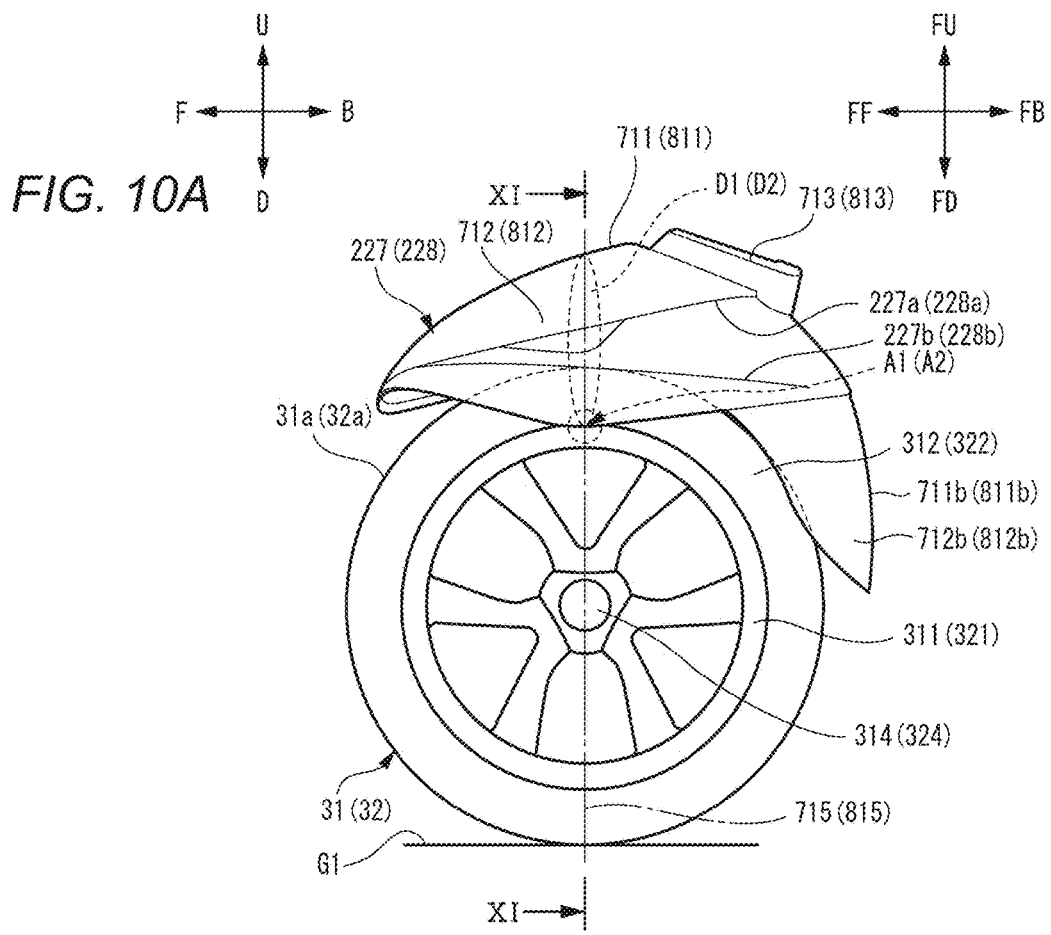
FIGS. 10A and 10B are a left side view showing the appearance of the left front fender.
Figure 10B:
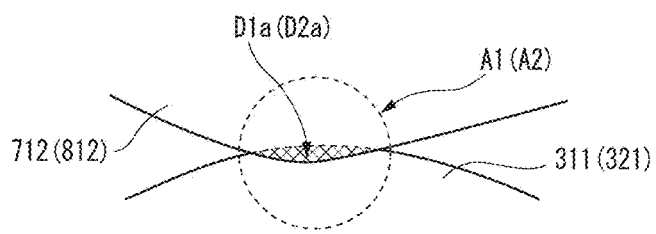

FIGS. 10A and 10B show views of appearances of the left front wheel 31 and the left front fender 227 as seen from the left in the left-right direction of the body frame 21 in the state shown in FIGS. 7 and 8. Namely, FIGS. 10A and 10B show a state in which the not-shown body frame 21 is in the upright state and the left front wheel 31 is not turned by the steering device 7. The following description that refers to FIGS. 10A and 10B will be made based on this state. The right front wheel 32 and the right front fender 228 are symmetrical with the left front wheel 31 and the left front fender 227 relative to the left-right direction. Thus, corresponding reference numbers of the right front wheel 32 and the right front fender 228 are added in parentheses to those of the left front wheel 31 and the left front fender 227 and the description thereof will be omitted.

Figure 11:
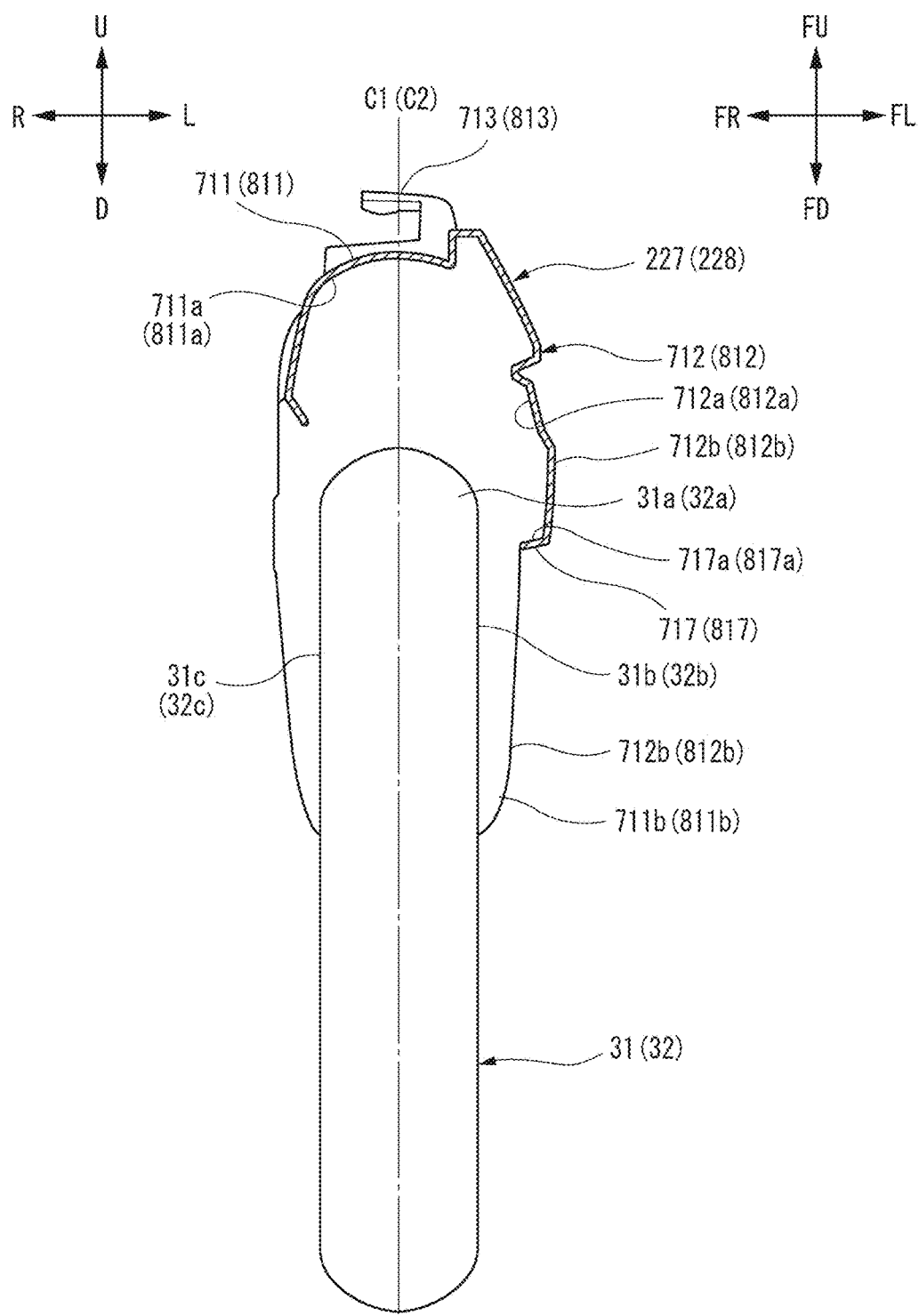
FIG. 11 is a front view showing a cross section of the left front fender taken along the line XI-XI in FIG. 10.

FIG. 11 is a front view of the left front wheel 31 and the left front fender 227 as seen from the front in the front-rear direction of the body frame 21, and only the left front fender 227 is shown in section as taken along a line XI-XI in FIG. 10A. The right front wheel 32 and the right front fender 228 are symmetrical with the left front wheel 31 and the left front fender 227 relative to the left-right direction. Thus, corresponding reference numbers of the right front wheel 32 and the right front fender 228 are added in parentheses to those of the left front wheel 31 and the left front fender 227 and the description thereof will be omitted.

Figure 12:
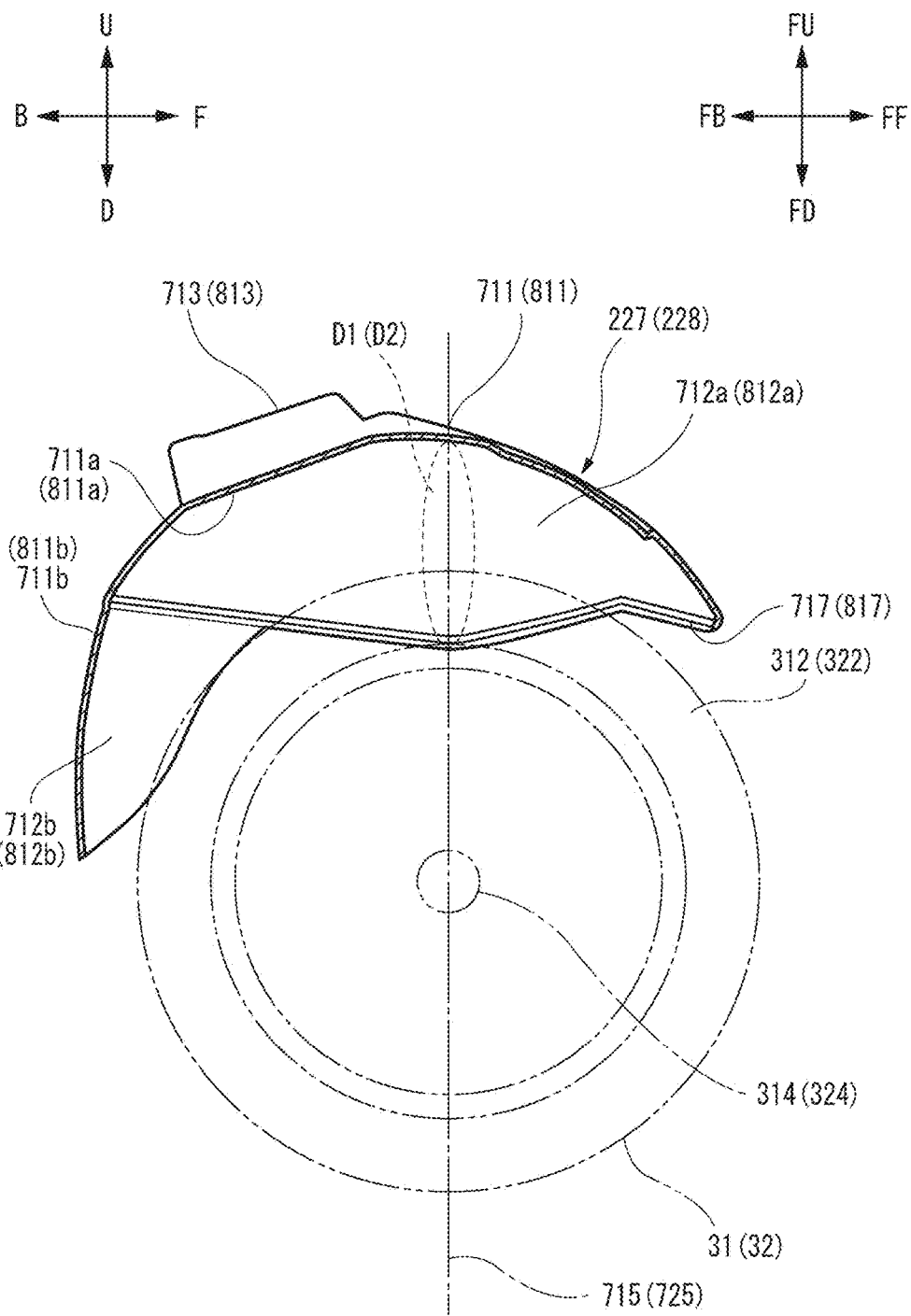
FIG. 12 is a right side view showing a cross section of the left front fender taken along the line XII-XII in FIG. 9.

FIG. 12 is a section view of the left front fender 227 taken along a ling XII-XII in FIG. 9. The right front fender 228 is laterally symmetrical with the left front fender 227. Thus, corresponding reference numbers of the right front wheel 32 and the right front fender 228 are added in parentheses to those of the left front wheel 31 and the left front fender 227 and the description thereof will be omitted.

The left front fender 227 includes a left mounting portion 713. The left mounting portion 713 is fixed to the left bracket 317. This allows the left front fender 227 to turn together with the left bracket 317 and the left front wheel 31 as they are turned by the steering device 7. Additionally, the relative positions of the left front fender 227 and the left front wheel 31 change as the left shock absorbing mechanism 33 extends or contracts.

The left front fender 227 includes a left upper wall portion 711. As shown in FIG. 11, the left upper wall portion 711 defines a left upper inner surface 711a. The left upper inner surface 711a faces a portion of the upper surface 31a of the left front wheel 31.

The left front fender 227 includes a left side wall portion 712. As shown in FIG. 11, the left side wall portion 712 defines a left side inner surface 712a. The left side inner surface 712a extends downward from the left upper inner surface 711a in the up-down direction of the body frame 21. The left side inner surface 712a faces a left side surface 31b of the left front wheel 31. As shown in FIG. 10, the left front wheel 31 includes a wheel portion 311 and a tire portion 313 that is mounted on an outer circumference of the wheel portion 311. The "left side surface 31b of the left front wheel 31" means a surface of the left front wheel 31 that is oriented to the left of the body frame 21 in the left-right direction thereof irrespective of the left side surface 31b being on the wheel portion 311 or the tire portion 312.

The left front fender 227 includes a left guide portion 717. As shown in FIG. 11, the left guide portion 717 defines a left guide surface 717a. The left guide surface 717a extends from the left side inner surface 712a to the right of the body frame 21 in the left-right direction thereof towards the left side surface 31b of the left front wheel 31.

The right front fender 228 includes a right mounting portion 813. The right mounting portion 813 is fixed to the right bracket 327. This allows the right front fender 228 to turn together with the right bracket 327 and the right front wheel 32 as they are turned by the steering device 7. Additionally, the relative positions of the right front fender 228 and the right front wheel 32 change as the right shock absorbing mechanism 34 extends or contracts.

The right front fender 228 includes a right upper wall portion 811. As shown in FIG. 11, the right upper wall portion 811 defines a right upper inner surface 811a. The right upper inner surface 811a faces a portion of the upper surface 32a of the right front wheel 31.

The right front fender 228 includes a right side wall portion 812. As shown in FIG. 11, the right upper wall portion 812 defines a right side inner surface 812a. The right side inner surface 812a extends downward from the right upper inner surface 811a in the up-down direction of the body frame 21. The right side inner surface 812a faces a right side surface 32b of the right front wheel 32. As shown in FIG. 10, the right front wheel 32 includes a wheel portion 321 and a tire portion 322 that is mounted on an outer circumference of the wheel portion 321. The "right side surface 32b of the right front wheel 32" means a surface of the right front wheel 32 that is oriented to the right of the body frame 21 in the left-right direction thereof irrespective of the right side surface 32b being on the wheel portion 321 or the tire portion 322.

The right front fender 228 includes a right guide portion 817. As shown in FIG. 11, the right guide portion 817 defines a right guide surface 817a. The right guide surface 817a extends from the right side inner surface 812a to the left of the body frame 21 in the left-right direction thereof towards the right side surface 32b of the right front wheel 32.

The inventors studied in detail the reasons for the occurrence of the phenomenon in which the leg portions of the rider sitting on the seat of the vehicle are splashed with water scattered by the two front wheels. As a result, the following phenomenon was confirmed.

Water scattered by the left front wheel while the vehicle is running adheres to an inner surface of the left front fender. The water that adheres falls from a lower edge of the inner surface of the left front fender to the left of the left front wheel in the form of water drops. The drops of water that have fallen are accelerated rearward by the air that flows rearward along the left of the left front wheel at high speeds to splash the leg portion or the like of the rider sitting on the seat provided behind the left front wheel.

Water scattered by the right front wheel while the vehicle is running adheres to an inner surface of the right front fender. The water that adheres falls from a lower edge of the inner surface of the right front fender to the right of the right front wheel in the form of water drops. The drops of water that have fallen are accelerated rearward by the air that flows rearward along the right of the right front wheel at high speeds to splash the leg portion or the like of the rider sitting on the seat provided behind the right front wheel.

Namely, the phenomenon described above is attributed to the generation of the airflows that pass the left of the left front wheel and the right of the right front wheel and flow in the front-rear direction of the body frame at high speeds, in the vehicle including the leanable body frame and the two front wheels arranged side by side in the left-right direction of the body frame. In other words, the phenomenon described above is a specific phenomenon to a vehicle that includes a leanable body frame and two front wheels arranged side by side in the left-right direction of the body frame.

Figure 13A:
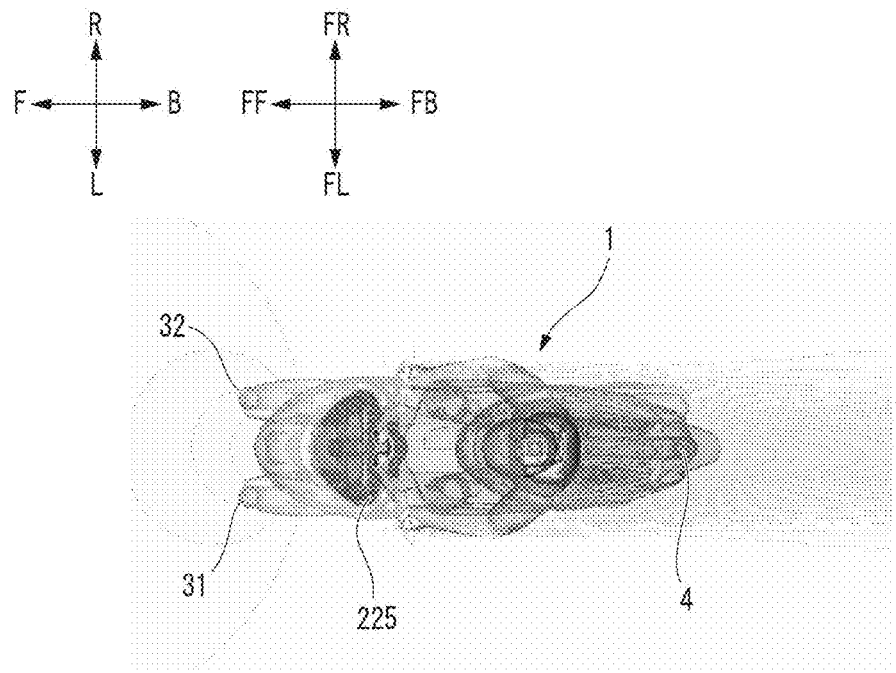
FIGS. 13A and 13B are views showing speeds of air which flows around the circumference of the vehicle of FIG. 1 when the vehicle is running.
Figure 13B:
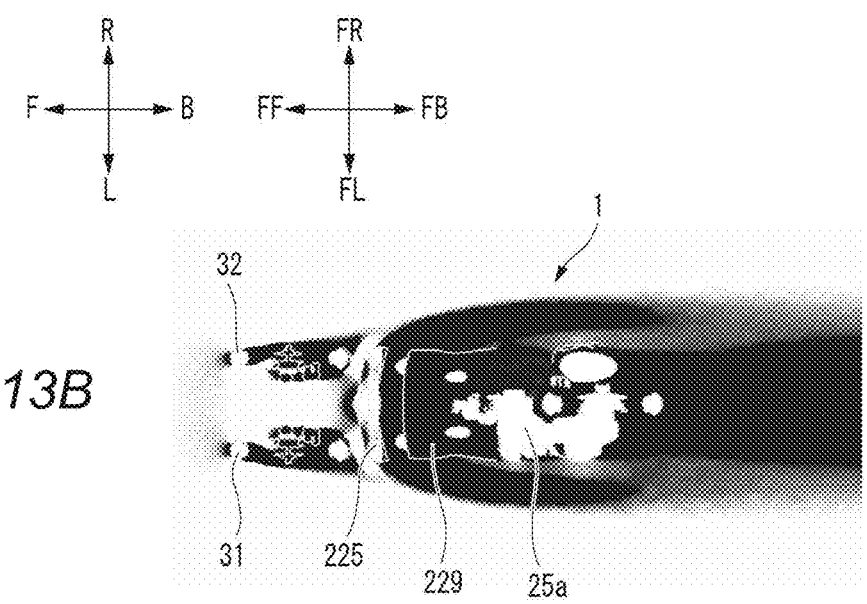

Then, the inventors studied a configuration that significantly reduces the amount of water that flows rearward of such a vehicle while reducing the size thereof. Specifically, speeds were analyzed at which air flows on the periphery of a vehicle while it is running. FIGS. 13A and 13B show the results of the analysis. FIG. 13A shows speeds of air which flow on the periphery of the vehicle 1 in a position that is almost as high as the waist of the rider in the up-down direction of the body frame 21. FIG. 13B shows speeds of air which flow on the periphery of a lower portion (that is below front ends of the two front wheels 3 and the rear wheel 4) of the vehicle 1. Portions which are darker in color indicate that the speed of an air flow is slower. In the figure, reference numeral 25a denotes an engine that is included in the power unit 25. In the figure, reference numeral 229 denotes a foot rest portion where the rider rests his or her feet.

The inventors discovered from the results of the study that spaces where speeds at which air flows are slow are formed in positions near the left side surface 31b of the left front wheel 31 and the right side surface 32b of the right front wheel 32. Then, the inventors discovered and developed a construction that controls water that drops from the inner surfaces of the front fenders by devising the shapes of the left and right front fenders 223 based on the knowledge obtained by the analysis described above.

Specifically, in the vehicle 1 that includes the leanable body frame 21 and the two front wheels 3 that are arranged side by side in the left-right direction of the body frame 21, the left front fender 227 and the right front fender 228 are arranged side by side in the left-right direction of the body frame 21. The left front fender 227 includes the left upper wall portion 711 that defines the left upper inner surface 711a that faces the portion of the upper surface 31a of the left front wheel 31; the left side wall portion 712 that extends downward from the left upper inner surface 711a in the up-down direction of the body frame 21 to define the left side inner surface 712a that faces the portion of the left side surface 31b of the left front wheel 31; and the left guide portion 717 that defines the left guide surface 717a that extends from the left side inner surface 712a to the right of the body frame 21 in the left-right direction thereof towards the left side surface 31b of the left front wheel 31. The right front fender 228 includes the right upper wall portion 811 that defines the right upper inner surface 811a that faces the portion of the upper surface 32a of the right front wheel 32; the right side wall portion 812 that extends downward from the right upper inner surface 811a in the up-down direction of the body frame 21 to define the right side inner surface 812a that faces the portion of the right side surface 32b of the right front wheel 32; and the right guide portion 817 that defines the right guide surface 817a that extends from the right side inner surface 812a to the left of the body frame 21 in the left-right direction thereof towards the right side surface 32b of the right front wheel 32.

By using the configuration described above, when the vehicle 1 is running, airflows directed rearward are generated on the left of the left side wall portion 712 of the left front fender 227 and on the right of the right side wall portion 812 of the right front fender 228. On the other hand, spaces where air flows at slow speeds are defined between the left side wall portion 712 of the left front fender 227 and the left side surface 31b of the left front wheel 31 as well as between the right side wall portion 812 of the right front fender 228 and the right side surface 32b of the right front wheel 32.

The left upper inner surface 711a of the left upper wall portion 711 of the left front fender 227 faces the portion of the upper surface 31a of the left front wheel 31 and receives water scattered upward by the left front wheel 31. The left side inner surface 712a of the left side wall portion 712 extends downward from the left upper inner surface 711a to face the portion of the left side surface 31b of the left front wheel 31 not only to transfer downward the water received by the left upper inner surface 711a but also to receive water scattered leftward by the left front wheel 31. The left guide surface 717a of the left guide portion 717 extends from the left side inner surface 712a rightward towards the left side surface 31b of the left front wheel 31 so that the water coming along the left side inner surface 712a is guided to a position that is located closer to the left side surface 31b of the left front wheel 31 than the left side wall portion 712 of the left front fender 227, that is, to a position where air flows at slower speeds. In the spaces where air flows at slow speeds, since the water that drops from the left guide portion 717 tends to fall towards the road surface, it is possible to significantly reduce or prevent water scattered by the left front wheel 31 from being scattered rearward.

The right upper inner surface 811a of the right upper wall portion 811 of the right front fender 228 faces the portion of the upper surface 32a of the right front wheel 32 and receives water scattered upward by the right front wheel 32. The right side inner surface 812a of the right side wall portion 812 extends downward from the right upper inner surface 811a to face the portion of the right side surface 32b of the right front wheel 32 not only to transfer downward the water received by the right upper inner surface 811a but also to receive water scattered rightward by the right front wheel 32. The right guide surface 817a of the right guide portion 817 extends from the right side inner surface 812a leftward towards the right side surface 32b of the right front wheel 32 so that the water coming along the right side inner surface 812a is guided to a position that is located closer to the right side surface 32b of the right front wheel 32 than the right side wall portion 812 of the right front fender 228, that is, to a position where air flows at slower speeds. In the spaces where air flows at slow speeds, since the water that drops from the right guide portion 817 tends to fall towards the road surface, it is possible to significantly reduce or prevent water scattered by the right front wheel 32 from being scattered rearward.

In addition, the left guide portion 717 of the left front fender 227 includes the left guide surface 717a that extends from the left side inner surface 712a rightward in the left-right direction of the body frame 21 towards the left side surface 31b of the left front wheel 31. The right guide portion 817 of the right front fender 228 includes the right guide surface 817a that extends from the right side inner surface 812a leftward in the left-right direction of the body frame 21 towards the right side surface 32b of the right front wheel 32. Since the left guide portion 717 and the right guide portion 817 utilize the spaces defined between the left front fender 227 and the left front wheel 31 as well as between the right front fender 228 and the right front wheel 32, respectively, the vehicle 1 is made smaller in size.

Consequently, it is possible to significantly reduce or prevent the generation of the phenomenon of the leg portions of the rider sitting on the seat being splashed with water scattered by the two front wheels 3 while making the vehicle 1 including the leanable body frame 21 and the two front wheels 3 that are arranged side by side in the left-right direction of the body frame 21 small in size.

In the above preferred embodiments, a portion of the left guide portion 717 is preferably provided at a lower portion of the left side wall portion 712. When referred to herein, the "lower portion of the left side wall portion 712" means an area that is located closer to a lower end than to an upper end of the left side wall portion 712. In addition, a portion of the right guide portion 817 is provided at a lower portion of the right side wall portion 812. When referred to herein, the "lower portion of the right side wall portion 812" means an area that is located closer to a lower end than to an upper end of the right side wall portion 812.

According to the configuration described above, it is possible to allow water to drop from the left guide portion 717 and the right guide portion 817 at lower positions. This makes it difficult for water that has dropped to splash the leg portions of the rider even though the water is scattered rearward. Consequently, it is possible to significantly reduce or prevent the generation of the phenomenon of the leg portions of the rider sitting on the seat 24 being splashed with water scattered by the two front wheels 3 while making the vehicle 1 including the leanable body frame 21 and the two front wheels 3 that are arranged side by side in the left-right direction of the body frame 21 small in size.

As shown in FIG. 12, in the above preferred embodiments, the left guide portion 717 is a wall that extends continuously. The left guide portion 717 extends forward and rearward in the front-rear direction of the body frame 21 relative to the left supporting axle 314 (an example of a wheel axle) of the left front wheel 31. The right guide portion 817 is a wall that extends continuously. The right guide portion 817 extends forward and rearward in the front-rear direction of the body frame 21 relative to the right supporting axle 324 (an example of a wheel axle) of the right front wheel 32.

According to the configuration described above, the left guide portion 717 allows the water that flows along the left side wall portion 712 to drop to the position located near the left side surface 31b of the left front wheel 31 over a wider range. In addition, the right guide portion 817 allows the water that flows along the right side wall portion 812 to drop to the position lying near the right side surface 32b of the right front wheel over a wider range. Consequently, it is possible to significantly reduce or prevent the generation of the phenomenon of the leg portions of the rider sitting on the seat 24 being splashed with water scattered by the two front wheels 3 while making the vehicle 1 including the leanable body frame 21 and the two front wheels 3 that are arranged side by side in the left-right direction of the body frame 21 small in size.

As shown in FIG. 12, a portion of the rear portion 711b of the left upper wall portion 711 and a portion of the rear portion 712b of the left side wall portion 712 are preferably disposed below the left guide portion 717 in the up-down direction of the body frame 21. When referred to herein, the "rear portion 711b of the left upper wall portion 711" means an area that is located closer to a rear end than to a front end of the left upper wall portion 711. When referred to herein, the "rear portion 712b of the left side wall portion 712" means an area that is located closer to a rear end than to a front end of the left side wall portion 712.

As shown in FIG. 12, a portion of the rear portion 811b of the right upper wall portion 811 and a portion of the rear portion 812b of the right side wall portion 812 are preferably disposed below the right guide portion 817 in the up-down direction of the body frame 21. When referred to herein, the "rear portion 811b of the right upper wall portion 811" means an area that is located closer to a rear end than to a front end of the right upper wall portion 811. When referred to herein, the "rear portion 812b of the right side wall portion 812" means an area that is located closer to a rear end than to a front end of the right side wall portion 812.

According to the configuration described above, the water that drops from the left guide portion 717 to be scattered rearward is received by the rear portion 711b of the left upper wall portion 711 and the rear portion 712b of the left side wall portion 712. In addition, the water that drops from the right guide portion 817 to be scattered rearward is received by the rear portion 811b of the right upper wall portion 811 and the rear portion 812b of the right side wall portion 812. Consequently, it is possible to significantly reduce or prevent the generation of the phenomenon of the leg portions of the rider sitting on the seat 24 being splashed with water scattered by the two front wheels 3 while making the vehicle 1 including the leanable body frame 21 and the two front wheels 3 that are arranged side by side in the left-right direction of the body frame 21 small in size.

A line C1 in FIG. 11 indicates a center of the left front wheel 31 in the left-right direction of the body frame 21. As is apparent from FIG. 9, in the event that the line C1 is regarded as a symmetrical axis, the left front fender 227 has an asymmetrical shape as seen from the front in the front-rear direction of the body frame 21 in such a state that the body frame 21 is in the upright state and the steering device 7 does not perform a turning operation.

A line C2 in FIG. 11 indicates a center of the right front wheel 32 in the left-right direction of the body frame 21. As is apparent from FIG. 9, in the event that the line C2 is regarded as a symmetrical axis, the right front fender 228 has an asymmetrical shape as seen from the front in the front-rear direction of the body frame 21 in such a state that the body frame 21 is in the upright state and the steering device 7 does not perform a turning operation.

Water that is scattered by the left front wheel 31 is significantly reduced or prevented from being scattered rearward by the left side wall portion 712 and the left guide portion 717 that are provided on the left of the left side surface 31b of the left front wheel 31. Since the necessity of providing a similar construction on the right of the right side surface 31c of the left front wheel 31 is low, the degree of freedom in designing the shape of the left front fender 227 at that location to be smaller in size is enhanced. Similarly, water that is scattered by the right front wheel 32 is significantly reduced or prevented from being scattered rearward by the right side wall portion 812 and the right guide portion 817 that are provided on the right of the right side surface 32b of the right front wheel 32. Since the necessity of providing a similar construction on the left of the left side surface 32c of the right front wheel 32 is low, the degree of freedom in designing the shape of the right front fender 228 at that location to be smaller in size is enhanced. Consequently, it is possible to significantly reduce or prevent the generation of the phenomenon of the leg portions of the rider sitting on the seat 24 being splashed with water scattered by the two front wheels 3 while making the vehicle 1 including the leanable body frame 21 and the two front wheels 3 that are arranged side by side in the left-right direction of the body frame 21 smaller in size.

As shown in FIG. 10A, as seen from the left in the left-right direction of the body frame 21, the left side wall portion 712 covers a portion D1 that overlaps an imaginary line 715 that is perpendicular or substantially perpendicular to a ground surface G1 that passes through the left supporting axle 314 of the left front wheel 31 without any uncovered portion. In other words, neither an opening nor a gap is located in the portion D1. As shown in FIG. 10B which is an enlarged view of an area A1 in FIG. 10A, a lower end portion D1a of the portion D1 in the left side wall portion 712 is disposed in a position that overlaps the wheel portion 311 of the left front wheel 31 as seen from the left in the left-right direction of the body frame 21.

As shown in FIG. 10A, as seen from the right in the left-right direction of the body frame 21, the right side wall portion 812 covers a portion D2 that overlaps an imaginary line 815 that is perpendicular or substantially perpendicular to the ground surface G1 that passes through the right supporting axle 324 of the right front wheel 32 without any uncovered portion. In other words, neither an opening nor a gap is located in the portion D2. As shown in FIG. 10B which is an enlarged view of an area A2 in FIG. 10A, a lower end portion D1a of the portion D1 in the right side wall portion 812 is disposed in a position that overlaps the wheel portion 321 of the right front wheel 32 as seen from the right in the left-right direction of the body frame 21.

According to the configuration described above, there is no such situation that water that has been scattered by the left front wheel 31 and received by the left upper inner surface 711a and the left side inner surface 712a flows outward of the left side wall portion 712 through an opening or gap to be scattered rearward. Similarly, there is no such situation that water that has been scattered by the right front wheel 32 and received by the right upper inner surface 811a and the right side inner surface 812a flows outward of the right side wall portion 812 through an opening or gap to be scattered rearward. Consequently, it is possible to significantly reduce or prevent the generation of the phenomenon of the leg portions of the rider sitting on the seat 24 being splashed with water scattered by the two front wheels 3 while making the vehicle 1 including the leanable body frame 21 and the two front wheels 3 that are arranged side by side in the left-right direction of the body frame 21 small in size.

As shown in FIG. 9 and in FIG. 10A, the left front fender 227 includes ridge lines 227a, 227b on an outer surface thereof. The ridge lines 227a, 227b extend from a front end portion of the left front fender 227 rearward in the front-rear direction of the body frame 21 along an outer surface of the left side wall portion 712.

As shown in FIG. 9 and in FIG. 10A, the right front fender 228 includes ridge lines 228a, 228b on an outer surface thereof. The ridge lines 228a, 228b extend from a front end portion of the right front fender 228 rearward in the front-rear direction of the body frame 21 along an outer surface of the right side wall portion 812.

A portion of water that has been scattered by the left front wheel 31 may move around from the front end portion of the left front fender 227 to the outer surface of the left side wall portion 712. However, according to the configuration described above, such water is rectified by the ridge lines 227a, 227b and is then guided to a rear portion 711b of the left upper wall portion 711 and a rear portion 712b of the left side wall portion 712. This significantly reduces or prevents water that has not been caught by the left upper inner surface 711a and the left side inner surface 712a from being scattered rearward. Similarly, a portion of water that has been scattered by the right front wheel 32 may move around from the front end portion of the right front fender 228 to the outer surface of the right side wall portion 812. However, according to the configuration described above, the water is rectified by the ridge lines 228a, 228b and is then guided to a rear portion 811b of the right upper wall portion 811 and a rear portion 812b of the right side wall portion 812. This significantly reduces or prevents water that has not been caught by the right upper inner surface 811a and the right side inner surface 812a from being scattered rearward. Consequently, it is possible to significantly reduce or prevent the generation of the phenomenon of the leg portions of the rider sitting on the seat 24 being splashed with water scattered by the two front wheels 3 while making the vehicle 1 including the leanable body frame 21 and the two front wheels 3 that are arranged side by side in the left-right direction of the body frame 21 small in size.

The preferred embodiments described heretofore are intended to facilitate the understanding of the present invention and are not intended to limit the present invention. The preferred embodiments of the present invention can be modified or improved without departing from the scope thereof and that their equivalents can be also included in the present invention.

In the preferred embodiments described above, the left upper wall portion 711 of the left front fender 227 preferably defines the left upper inner surface 711a that faces the portion of the upper surface 31a of the left front wheel 31. However, the left upper wall portion 711 may be shaped so that the left upper inner surface 711a faces the whole of the upper surface 31a of the left front wheel 31.

In the preferred embodiments described above, the right upper wall portion 811 of the right front fender 228 preferably defines the right upper inner surface 811a that faces the portion of the upper surface 32a of the right front wheel 32. However, the right upper wall portion 811 may be shaped so that the right upper inner surface 811a faces the whole of the upper surface 32a of the right front wheel 32.

In the above preferred embodiments, a portion of the left guide portion 717 of the left front fender 227 is preferably provided at the lower portion of the left side wall portion 712. However, at least a portion of the left guide portion 717 may be provided at an upper portion of the left side wall portion 712, as long as the left guide surface 717a extends from the left side inner surface 712a towards the left side surface 31b of the left front wheel 31.

In the above preferred embodiments, a portion of the right guide portion 817 of the right front fender 228 is preferably provided at the lower portion of the right side wall portion 812. However, at least a portion of the right guide portion 817 may be provided at an upper portion of the right side wall portion 812, as long as the right guide surface 817a extends from the right side inner surface 812a towards the right side surface 32b of the right front wheel 32.

In the preferred embodiments described above, the left guide portion 717 preferably includes a portion that extends in the front-rear direction of the body frame 21. However, the left guide portion 717 may be provided so as to include a portion that extends in the up-down direction of the body frame 21 as long as the left guide surface 717a extends from the left side inner surface 712a towards the left side surface 31b of the left front wheel 31.

In the preferred embodiments described above, the right guide portion 817 preferably includes a portion that extends in the front-rear direction of the body frame 21. However, the right guide portion 817 may include a portion that extends in the up-down direction of the body frame 21 as long as the right guide surface 817a extends from the right side inner surface 812a towards the right side surface 32b of the right front wheel 32.

In the above preferred embodiments, the left guide portion 717 preferably extends forward and rearward in the front-rear direction of the body frame 21 relative to the left supporting axle 314 of the left front wheel 31. However, the left guide portion 717 may extend either forward or rearward in the front-rear direction of the body frame 21 relative to the left supporting axle 314 of the left front wheel 31.

In the above preferred embodiments, the right guide portion 817 extends forward and rearward in the front-rear direction of the body frame 21 relative the right supporting axle 324 of the right front wheel 32. However, the right guide portion 817 may extend either forward or rearward in the front-rear direction of the body frame 21 relative to the right supporting axle 324 of the right front wheel 32.

In the preferred embodiments described above, each of the left guide portion 717 and the right guide portion 817 includes a wall that extends continuously in the front-rear direction of the body frame 21. When referred to herein, the "wall that extends continuously" means that a configuration is included in which a plurality of walls are arranged at such intervals that do not permit the passage of water therethrough. However, each of the left guide portion 717 and the right guide portion 817 may include a plurality of portions that are arranged at such intervals that permit the passage of water therethrough. In the event that each of the left guide portion 717 and the right guide portion 817 includes a portion that extends in the up-down direction of the body frame, each of the left guide portion 717 and the right guide portion 817 may include a plurality of portions that are arranged at such intervals that permit the passage of water therethrough.

In the preferred embodiments described above, the left wall portion 712 of the left front fender 227 preferably faces a portion of the left side surface 31b of the left front wheel 31 with neither opening nor gap being formed therein. However, as long as the left guide portion 717 is provided in the position that prevents the water caught by the left upper inner surface 711a and the left side inner surface 712a from flowing outward of the left side wall portion 712, a configuration may be used in which an opening or a gap is located in the left wall portion 712.

In the preferred embodiments described above, the right wall portion 812 of the right front fender 228 preferably faces a portion of the right side surface 32b of the right front wheel 32 with neither an opening nor a gap is located therein. However, as long as the right guide portion 817 is provided in the position that prevents the water caught by the right upper inner surface 811a and the right side inner surface 812a from flowing outward of the right side wall portion 812, a configuration may be used in which an opening or a gap is located in the right wall portion 812.

In the preferred embodiments described above, the left front fender 227 is preferably fixed to the left bracket 317, and the relative positions of the left front fender 227 and the left front wheel 31 preferably change as the left shock absorbing mechanism 33 extends or contracts. However, the left front fender 227 may be fixed to the left outer tube 33a of the left shock absorbing mechanism 33. As this occurs, the left front fender 227 is displaced together with the left front wheel 31 as the left shock absorbing mechanism 33 extends or contracts. In other words, the relative positions of the left front fender 227 and the left front wheel 31 do not change.

In the preferred embodiments described above, the right front fender 228 is preferably fixed to the right bracket 327, and the relative positions of the right front fender 228 and the right front wheel 32 preferably change as the right shock absorbing mechanism 34 extends or contracts. However, the right front fender 228 may be fixed to the right outer tube 34a of the right shock absorbing mechanism 34. As this occurs, the right front fender 228 is displaced together with the right front wheel 32 as the right shock absorbing mechanism 34 extends or contracts. In other words, the relative positions of the right front fender 228 and the right front wheel 32 do not change.

In the preferred embodiments described above, the shape of the left front fender 227 and the shape of the right front fender 228 are preferably symmetrical relative to the left-right direction. However, the shape of the left front fender 227 and the shape of the right front fender 228 may be asymmetrical relative to the left-right direction as long as the left upper inner surface 711a, the left side surface 712a, the left guide surface 717a, the right upper inner surface 811a, the right side inner surface 812a, and the right guide surface 817a have the functions described above.

In the above preferred embodiments, the left shock absorbing mechanism 33 and the right shock absorbing mechanism 34 preferably each include the pair of telescopic mechanisms. However, the left shock absorbing mechanism 33 and the right shock absorbing mechanism 34 may each include a single telescopic mechanism.

In the above preferred embodiments, the vehicle 1 preferably includes the single rear wheel 4. However, a plurality of rear wheels may be provided.

In the above preferred embodiments, the center of the rear wheel 4 in relation to the left-right direction of the body frame 21 preferably coincides with the center of the distance defined between the left front wheel 31 and the right front wheel 32 in relation to the left-right direction of the body frame 21. Although the configuration described above is preferable, the center of the rear wheel 4 in relation to the left-right direction of the body frame 21 may not coincide with the center of the distance defined between the left front wheel 31 and the right front wheel 32 in relation to the left-right direction of the body frame 21.

In the above preferred embodiments, the link mechanism 5 preferably includes the upper cross member 51 and the lower cross member 52. However, the link mechanism 5 may include a cross member other than the upper cross member 51 and the lower cross member 52. The "upper cross member" and the "lower cross member" are merely so called based on their relative positions in relation to the up-down direction. The upper cross member does not necessarily mean an uppermost cross member in the link mechanism 5. The upper cross member means a cross member which lies above another cross member which lies therebelow. The lower cross member does not necessarily mean a lowermost cross member in the cross mechanism 5. The lower cross member means a cross member which lies below another cross member which lies thereabove. At least one of the upper cross member 51 and the lower cross member 52 may include two portions such as a right cross member and a left cross member. In this way, the upper cross member 51 and the lower cross member 52 may include a plurality of cross members as long as they maintain the link function.

In the above preferred embodiments, the link mechanism 5 preferably defines the parallel four joint link system. To compare the parallel four joint system with a so-called double wishbone link mechanism, with the parallel four joint link system, a group of components defining the link mechanism 5 is easily combined into the front cover 221, so that a space defined between the left front wheel 31 and the right front wheel 32 in the left-right direction of the body frame 21 is easily narrowed. Consequently, it is possible to significantly reduce or prevent the generation of the phenomenon of the leg portions of the rider sitting on the seat 24 being splashed with water scattered by the two front wheels 3 while making the vehicle 1 including the leanable body frame 21 and the two front wheels 3 that are arranged side by side in the left-right direction of the body frame 21 smaller in size. However, the link mechanism 5 may use the double wishbone configuration.

The terms and expressions that are used in this description are used to describe the preferred embodiments of the present invention and hence should not be construed as limiting the scope of the present invention. It should be understood that any equivalents to the characteristic matters that are shown and described in this description should not be excluded and that various modifications made within the scope of claims to be made later are permitted.

When used in this description, the word "parallel" means that two straight lines which do not intersect each other as members while they are inclined at an angle falling within the range of ±40 degrees are included therein. When used in this description in relation to a direction and/or a member, the word "along" means that a case where the direction or the member is inclined at an angle falling within the range of ±40 degrees is included therein. When used in this description, the expression "something extends in a certain direction" means that a case where something extends while being inclined at an angle falling within the range of ±40 degrees relative to the certain direction is included therein.

The present invention can be embodied in many different forms. This description should be regarded as providing the preferred embodiments according to the principles of the present invention. The preferred embodiments which are at least described or illustrated in this description is so described or illustrated based on the understanding that the preferred embodiments are not intended to limit the present invention.

The present invention includes every preferred embodiment which includes an equivalent element, a modification, a deletion, a combination (for example, a combination of characteristics of various preferred embodiments), an improvement and an alteration which can be recognized by those skilled in the art to which the invention pertains based on the preferred embodiments disclosed in this description. The limitative matters of claims should be construed broadly based on terms used in the claims and hence should not be limited by the preferred embodiment described in this specification or the prosecution of this patent application. The preferred embodiments should be construed as being non-exclusive. For example, in this description, the terms "preferable" and "may" should be construed as being non-exclusive, and those terms mean, respectively, that it is "preferable but not limited thereto" and that it "may be acceptable but not limited thereto."

This application claims priority to Japanese Patent Applications No. 2013-138484 filed on Jul. 1, 2013 and No. 2013-138485 filed on Jul. 1, 2013, the entire contents of which are hereby incorporated by reference. Namely, configurations which will be itemized below also constitute portion of the description of this patent application.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A vehicle comprising:
a body frame that leans to the left of the vehicle when the vehicle turns leftward and that leans to the right of the vehicle when the vehicle turns rightward;
a seat supported by the body frame;
a left front wheel and a right front wheel disposed ahead of the seat in a front-rear direction of the body frame and arranged side by side in a left-right direction of the body frame;
a steering device that turns the left front wheel and the right front wheel;
a left front fender that is turnable with the left front wheel and covers at least a portion of an upper surface of the left front wheel; and
a right front fender that is turnable with the right front wheel and covers at least a portion of an upper surface of the right front wheel; wherein
the left front fender and the right front fender are arranged side by side in the left-right direction of the body frame;
the left front fender includes:
a left upper wall portion defining a left upper inner surface facing at least a portion of the upper surface of the left front wheel;
a left side wall portion extending from the left upper inner surface downward in an up-down direction of the body frame and defining a left side inner surface facing a portion of a left side surface of the left front wheel; and
a left guide portion defining a left guide surface extending from the left side inner surface rightward in the left-right direction toward the left side surface of the left front wheel;
the right front fender includes:
a right upper wall portion defining a right upper inner surface facing at least a portion of the upper surface of the right front wheel;
a right side wall portion extending from the right upper inner surface downward in the up-down direction of the body frame and defining a right side inner surface facing a portion of a right side surface of the right front wheel; and
a right guide portion defining a right guide surface extending from the right side inner surface leftward in the right-right direction toward the right side surface of the right front wheel; and
each of the left front fender and the right front fender has an asymmetrical shape as seen from a front in the front-rear direction of the body frame under a condition that the body frame is in an upright state and that the left front wheel and the right front wheel are not turned by the steering device.

2. The vehicle as set forth in claim 1, wherein
at least a portion of the left guide portion is provided in a lower portion of the left side wall portion; and
at least a portion of the right guide portion is provided in a lower portion of the right side wall portion.

3. The vehicle as set forth in claim 1, wherein each of the left guide portion and the right guide portion includes a portion extending in the front-rear direction.

4. The vehicle as set forth in claim 3, wherein
the left guide portion extends at least one of forward and rearward in the front-rear direction relative to a wheel axle of the left front wheel; and
the right guide portion extends at least one of forward and rearward in the front-rear direction relative to a wheel axle of the right front wheel.

5. The vehicle as set forth in claim 3, wherein each of the left guide portion and the right guide portion is a continuous wall.

6. The vehicle as set forth in claim 1, further comprising:
a link mechanism disposed above the left front wheel and the right front wheel in the up-down direction, and that leans the body frame to the left or right of the vehicle by changing positions of the left front wheel and the right front wheel relative to the body frame; wherein
the link mechanism includes:
an upper cross member;
a lower cross member disposed below the upper cross member in the up-down direction of the body frame;
a left side member disposed above the left front wheel in the up-down direction of the body frame; and a right side member disposed above the right front wheel in the up-down direction of the body frame; and the upper cross member, the lower cross member, the left side member, and the right side member are connected such that the upper cross member and the lower cross member are held in postures which are parallel or substantially parallel to each other, and such that the left side member and the right side member are held in postures which are parallel or substantially parallel to each other.

7. A vehicle comprising:

a body frame that leans to the left of the vehicle when the vehicle turns leftward and that leans to the right of the vehicle when the vehicle turns rightward;

a seat supported by the body frame;

a left front wheel and a right front wheel disposed ahead of the seat in a front-rear direction of the body frame and arranged side by side in a left-right direction of the body frame;

a steering device that turns the left front wheel and the right front wheel;

a left front fender that is turnable with the left front wheel and covers at least a portion of an upper surface of the left front wheel; and a right front fender that is turnable with the right front wheel and covers at least a portion of an upper surface of the right front wheel; wherein the left front fender and the right front fender are arranged side by side in the left-right direction of the body frame;

the left front fender includes:
- a left upper wall portion defining a left upper inner surface facing at least a portion of the upper surface of the left front wheel;
- a left side wall portion extending from the left upper inner surface downward in an up-down direction of the body frame and defining a left side inner surface facing a portion of a left side surface of the left front wheel; and
- a left guide portion defining a left guide surface extending from the left side inner surface rightward in the left-right direction toward the left side surface of the left front wheel;

the right front fender includes:
- a right upper wall portion defining a right upper inner surface facing at least a portion of the upper surface of the right front wheel;
- a right side wall portion extending from the right upper inner surface downward in the up-down direction of the body frame and defining a right side inner surface facing a portion of a right side surface of the right front wheel; and
- a right guide portion defining a right guide surface extending from the right side inner surface leftward in the right-right direction toward the right side surface of the right front wheel;

at least a portion of a rear portion of the left upper wall portion and at least a portion of a rear portion of the left side wall portion are disposed below the left guide portion in the up-down direction of the body frame; and at least a portion of a rear portion of the right upper wall portion and at least a portion of a rear portion of the right side wall portion are disposed below the right guide portion in the up-down direction of the body frame.

* * * * *